United States Patent
Ito et al.

(10) Patent No.: US 8,300,950 B2
(45) Date of Patent: Oct. 30, 2012

(54) IMAGE PROCESSING APPARATUS, IMAGE PROCESSING METHOD, PROGRAM, AND STORAGE MEDIUM

(75) Inventors: Yoshinori Ito, Tokyo (JP); Hiroshi Sato, Kawasaki (JP); Takashi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 12/390,963

(22) Filed: Feb. 23, 2009

(65) Prior Publication Data
US 2009/0220156 A1      Sep. 3, 2009

(30) Foreign Application Priority Data

Feb. 29, 2008 (JP) ................................. 2008-051118

(51) Int. Cl.
*G06K 9/46* (2006.01)

(52) U.S. Cl. ........................................................ 382/201

(58) Field of Classification Search .................. None
See application file for complete search history.

(56) References Cited

U.S. PATENT DOCUMENTS

| | | | |
|---|---|---|---|
| 7,039,233 B2 | 5/2006 | Mori et al. | |
| 2003/0138146 A1* | 7/2003 | Johnson et al. | 382/190 |
| 2006/0109521 A1* | 5/2006 | Shimazawa | 358/462 |
| 2008/0273761 A1 | 11/2008 | Kawata | |

FOREIGN PATENT DOCUMENTS

| | | |
|---|---|---|
| JP | 2002-358500 | 12/2002 |
| JP | 2004-265267 | 9/2004 |
| JP | 2005-242535 A | 9/2005 |
| JP | 2005-346654 | 12/2005 |
| JP | 2007-304857 A | 11/2007 |
| WO | 2005/124302 A1 | 12/2005 |

OTHER PUBLICATIONS

Rapid Object Detection using a Boosted Cascade of Simple Features (Proc. IEEE Conference on Computer Vision and Pattern Recognition, vol. 1, pp. 511-518, Dec. 2001), Paul Viola and Michael Jones.
Jun. 29, 2012 Japanese Office Action, which is enclosed without an English Translation, that issued in Japanese Patent Application No. 2008-051118.

* cited by examiner

*Primary Examiner* — Bhavesh Mehta
*Assistant Examiner* — Nirav G Patel
(74) *Attorney, Agent, or Firm* — Cowan, Liebowitz & Latman, P.C.

(57) ABSTRACT

A large number of stable local regions can be set with low calculation cost. In a face recognition apparatus which discriminates similar face images using feature amounts extracted from local regions included in an image to be discriminated, a moving destination of a feature point extracted from the image to be discriminated, and the size of an image to be clipped at the moving destination are calculated based on a table which defines information required to designate a moving destination of each feature point, and information required to designate the size of an image to be clipped at the moving destination, and an image with the calculated size is clipped at the calculated moving destination as the local region.

8 Claims, 20 Drawing Sheets

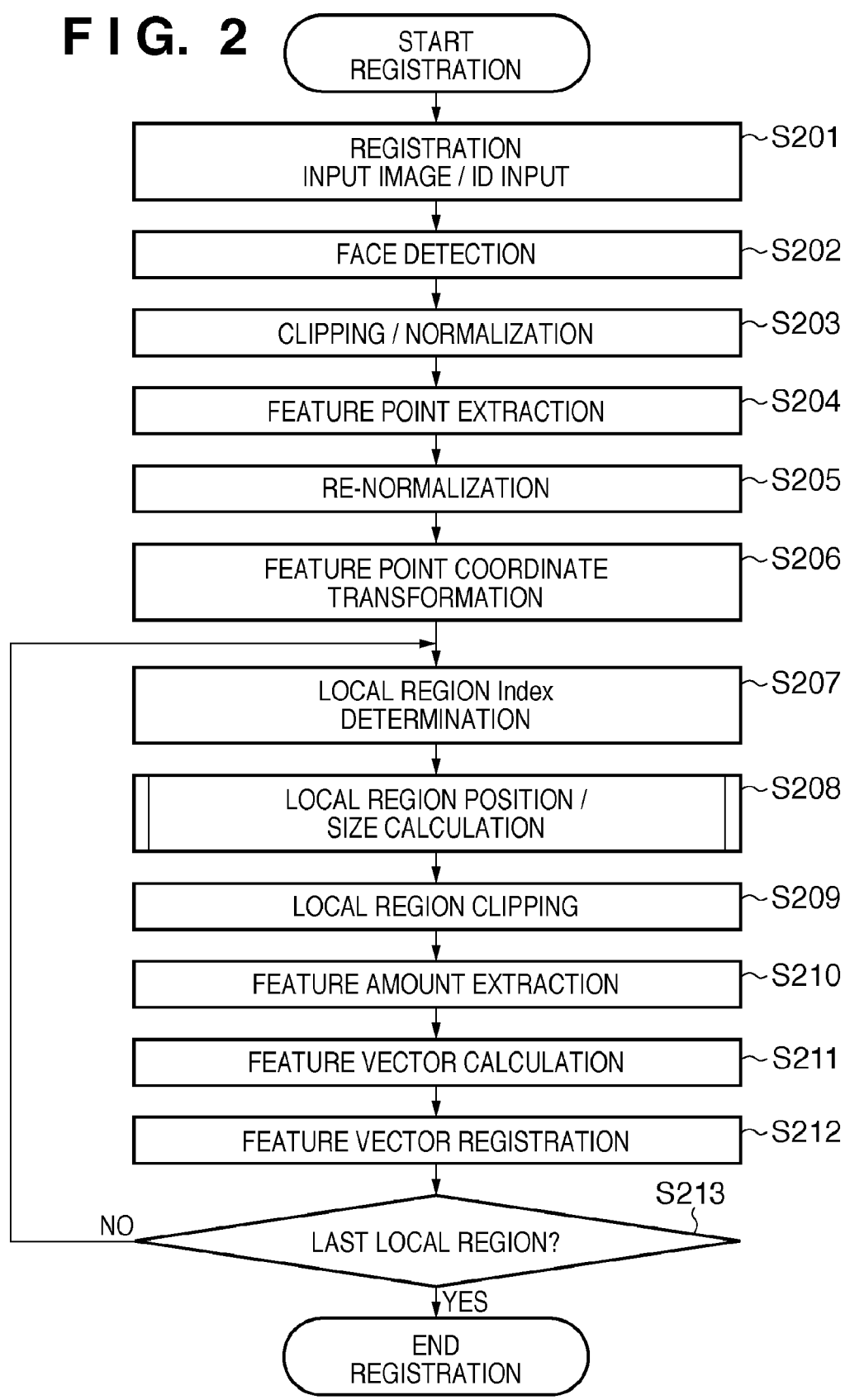

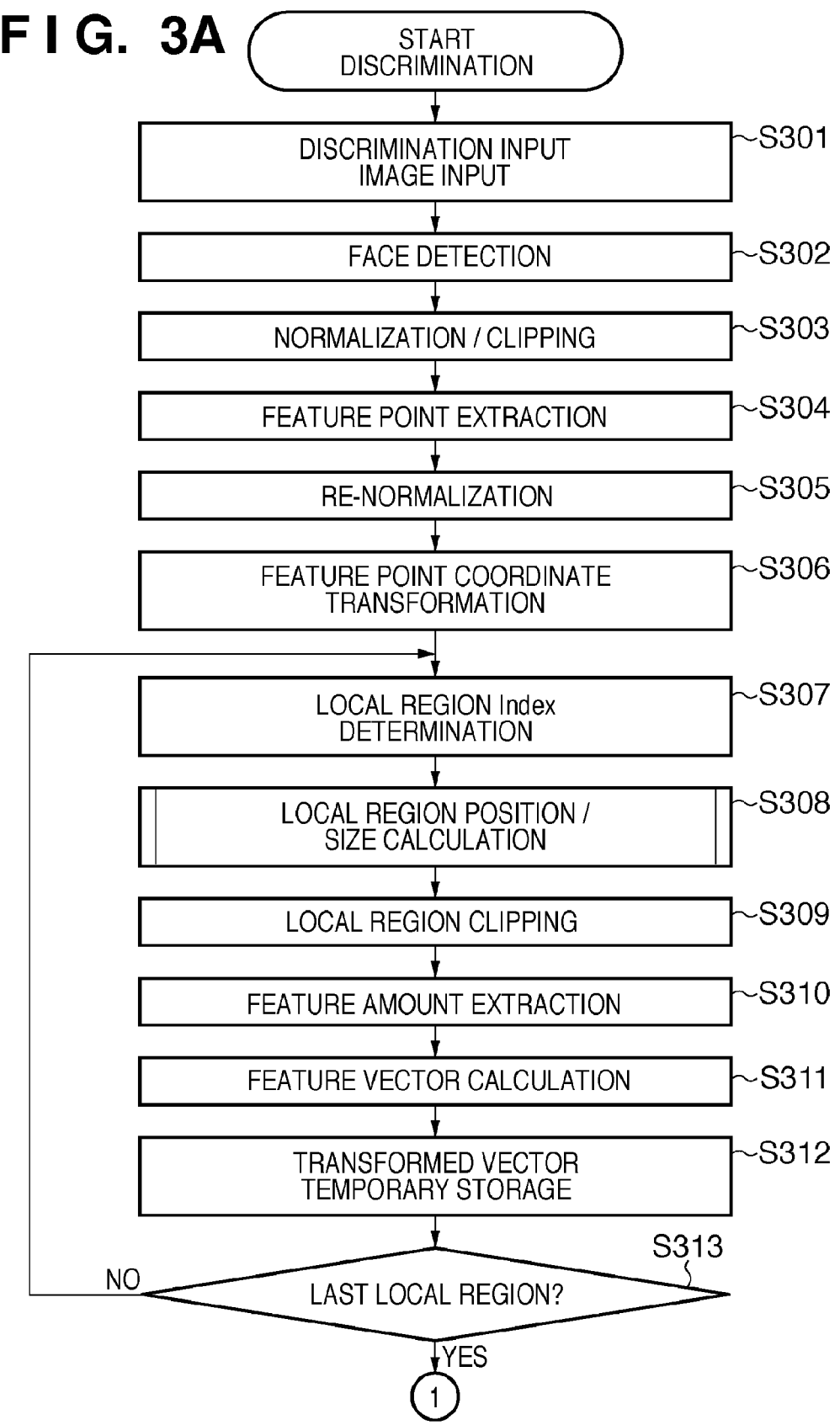

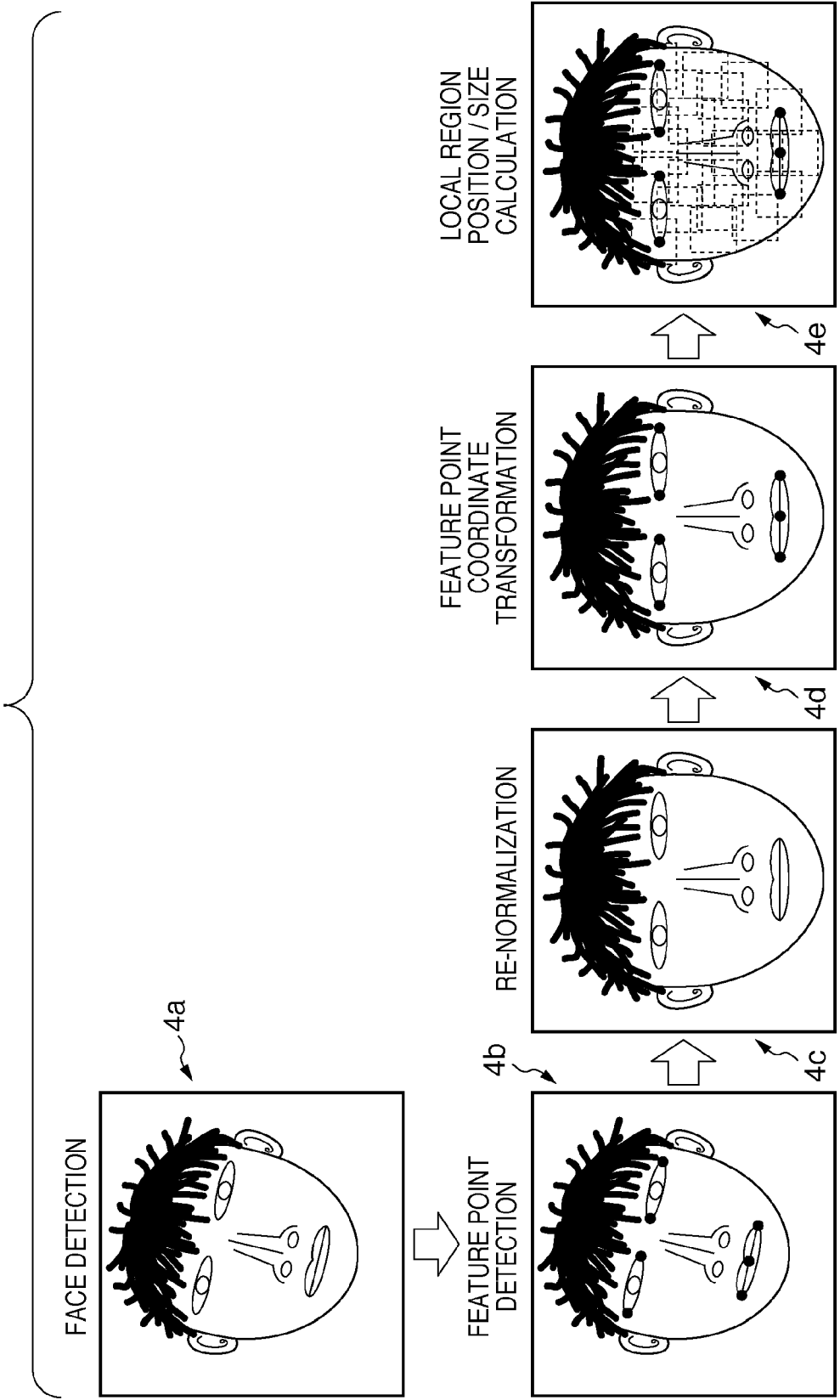

FIG. 13

| Index | 1 | 2 | 3 | 4 | 5 |
|---|---|---|---|---|---|
| INITIAL POINT | LeftEyeTail | LeftEyeHead | Middle_LeftRightEyes | MouthLeftTip | Mouth |
| MOVING DESTINATION 1 | Mode : SlideLine<br>From : LeftEyeTail<br>To : RightEyeTail<br>Ratio : 0.2 | Mode : SlideWidth<br>From : LeftEye<br>To : RightEye<br>Ratio : -0.1 | none | Mode : SlideWidth<br>From : MouthLeftTip<br>To : MouthRightTip<br>Ratio : 0.3 | Mode : SlidePixels<br>Pixels: (0, -10) |
| MOVING DESTINATION 2 | Mode : SlideHeight<br>From : RightEye<br>To : Mouth<br>Ratio : 0.45 | none | none | Mode : SlideHeight<br>From : RightEye<br>To : Mouth<br>Ratio : 0.45 | none |
| SIZE AFTER TRANSFORMATION | 13 × 13 | 13 × 13 | 21 × 13 | 21 × 21 | 21 × 21 |
| EXTRACTED FEATURE AMOUNT | LBP-R1 | LBP-R1 | LBP-R1 | LBP-R1 | LBP-R1 |
| PROJECTION MATRIX | P1(169, 8) | P2(169, 8) | P3(273, 10) | P4(441, 15) | P5(441, 15) |

120

F I G. 15
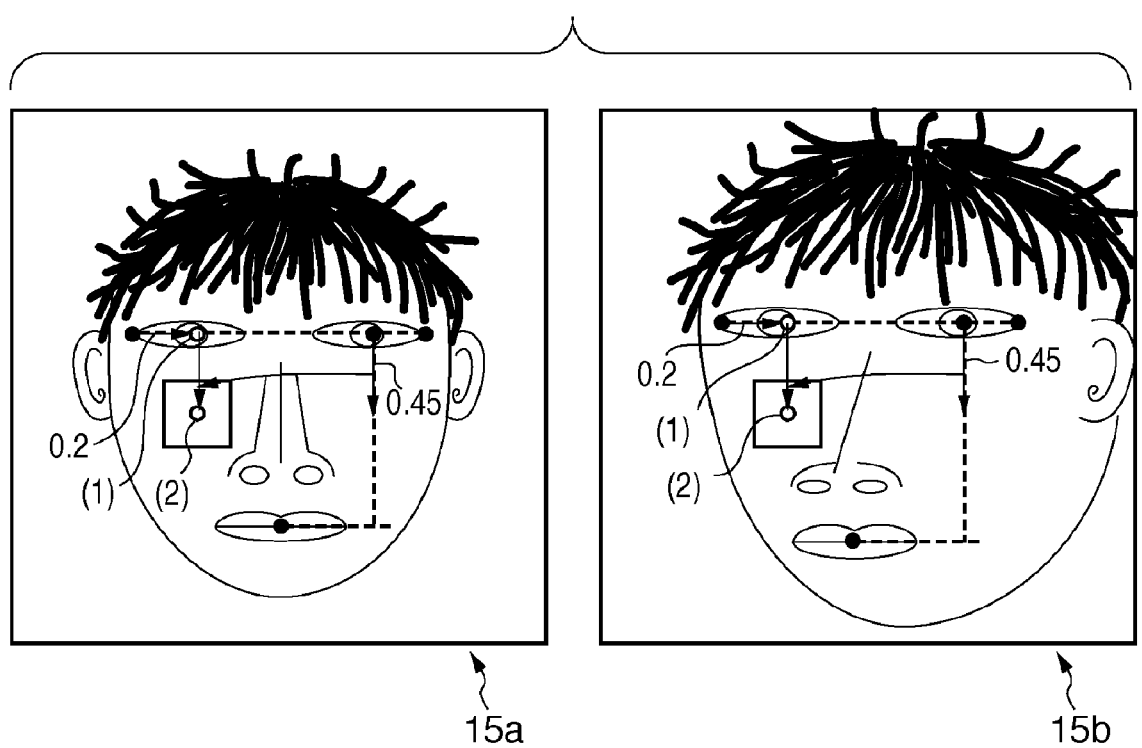

F I G. 18

| Index | 1 | 2 | 3 | 4 | 5 |
|---|---|---|---|---|---|
| INITIAL POINT | LeftEyeTail | LeftEyeHead | Middle_LeftRightEyes | MouthLeftTip | Mouth |
| MOVING DESTINATION 1 | Mode : SlideLine<br>From : LeftEyeTail<br>To : RightEyeTail<br>Ratio : 0.2 | Mode : SlideWidth<br>From : LeftEye<br>To : RightEye<br>Ratio : -0.1 | none | Mode : SlideWidth<br>From : MouthLeftTip<br>To : MouthRightTip<br>Ratio : 0.3 | Mode : SlidePixels<br>Pixels: (0, -10) |
| MOVING DESTINATION 2 | Mode : SlideHeight<br>From : RightEye<br>To : Mouth<br>Ratio : 0.45 | none | none | Mode : SlideHeight<br>From : RightEye<br>To : Mouth<br>Ratio : 0.45 | none |
| CLIPPING SIZE | Width :<br>Line(LeftEye, RightEye, 0.3)<br>Height :<br>Line(LeftEye, RightEye, 0.3) | Width :<br>Width(LeftEye, RightEye, 0.2)<br>Height :<br>Width(LeftEye, RightEye, 0.4) | | Width :<br>Width(MouthLeftTip, MouthRightTip, 0.5)<br>Height :<br>Height(MouthLeftTip, MouthRightTip, 0.5) | Fixed |
| SIZE AFTER TRANSFORMATION | 13×13 | 13×13 | 21×13 | 21×21 | 21×21 |
| EXTRACTED FEATURE AMOUNT | GJ_1_2 | GJ_1_3 | GJ_2_4 | GJ_1_1 | GJ_3_2 |
| PROJECTION MATRIX | P1(169, 8) | P2(169, 8) | P3(273, 10) | P4(441, 15) | P5(441, 15) |

120

20a    20b

IMAGE PROCESSING APPARATUS, IMAGE PROCESSING METHOD, PROGRAM, AND STORAGE MEDIUM

BACKGROUND OF THE INVENTION

1. Field of the Invention

The present invention relates to an image processing apparatus, image processing method, program, and storage medium, which discriminate similar images.

2. Description of the Related Art

In recent years, the development of personal authentication technologies based on physical features such as fingerprints, palm prints, veins, and irises, so-called biometrics authentication technologies has been made. Such biometrics authentication technologies include many technologies using, as objects to be processed, images acquired by photoelectric conversion devices such as digital cameras, and data obtained by converting images into two-dimensional spatial data corresponding to them.

Of these technologies, a face recognition technology using face images has particularly received a lot of attention due to disinclination less than other biometrics authentication technologies using, for example, fingerprints, since it is equivalent to a behavior made when one human identifies another.

One of the problems posed when executing personal authentication using images such as faces lies in the fact that patterns to be discriminated are relatively similar to each other. In case of "face detection" for detecting human faces from an arbitrary input natural image, differences between image patterns such as faces are very small compared to that from an image pattern as a background even if images are sensed under various image sensing conditions or include various persons.

That is, the face detection is considered as relatively easy pattern recognition, since it need only separate "similar" patterns having small differences as a face class from other patterns. A pattern recognition technology used in such face detection is disclosed in, for example, Japanese Patent Laid-Open No. 2002-358500, and P. Viola and M. Jones, "Rapid Object Detection using a Boosted Cascade of Simple Features" (Proc. IEEE Conf. on Computer Vision and Pattern Recognition, Vol. 1, pp. 511-518, December 2001.).

On the other hand, "face recognition" requires processing for discriminating individual classes by finding differences from similar patterns detected as a human face class. Then, differences caused by image sensing conditions, facial expressions, views of faces, accessories such as eyeglasses and makeup, and so forth of a single person often become larger than those between detected faces of different individuals.

That is, it is inherently a very difficult problem to extract only individual differences and to classify them into individual classes while ignoring differences caused by image sensing conditions and the like.

As a related art to solve this problem, a method of focusing on local regions of face images has been proposed. As for a plurality of face images obtained by sensing images of a certain individual, even if there are differences caused by image sensing conditions and the like, these influences do not uniformly appear on the entire face.

For example, even when a facial expression has changed, a difference near a nose is smaller than an image before alteration. Even when a face is strongly illuminated from an oblique direction, a difference in an illuminated part is smaller than a shadow part. Even in case of a left-view face with respect to an observer, a difference on the right side part is smaller than that on the left side part compared to a front-view image due to the three-dimensional shape of the face.

Therefore, even when a difference on a certain local region is large, it is expected that only differences which allow to identify an individual are generated on some other local regions. That is, by selectively using discrimination results based on local regions where only differences which allow to identify an individual are generated, satisfactory personal authentication can be implemented.

In order to determine the positions of such local regions, for example, an image recognition apparatus disclosed in Japanese Patent Laid-Open No. 2005-346654 adopts a positioning method based on a "standard face". The "standard face" is a face image generated by averaging a large number of normalized sample face images in association with respective pixels.

Then, a large number of feature points are set on this standard face image, as shown in, for example, FIG. 19. In case of Japanese Patent Laid-Open No. 2005-346654, neighboring regions including these feature points are used as local regions. When a normalized face image to be registered or discriminated is input, pattern matching is executed between feature points on the standard face to determine the positions of feature points on the input face image. Note that these feature points are selected in advance by machine learning.

Also, Yoshihisa Ijiri et al., "face recognition based on local region extraction according to face views" (Proceedings of 13th Symposium on Sensing via Imaging Information, Yokohama, Jun, 2007) (to be referred to as reference 1 hereinafter) discloses a face recognition method that sets local regions with reference to detected feature points. Note that each feature point serving as a reference point adopts one point such as the left end (outer corner) of the left eye, which can be relatively easily detected.

Then, the position of a local region is defined by predetermined shift amounts (a, b) in the abscissa (x-direction) and ordinate (y-direction) from the detected reference point. At this time, in order to always set the local region at nearly equal positions on an actual face, it is effective to change the shift amounts depending on face images. Also, in order to clip the local region to have a nearly equal range on an actual face, a range c to be clipped is preferably changed depending on face views.

Hence, in reference 1, face direction estimation is executed using position information of a plurality of detected feature points, and the position and range of the local region are changed according to the estimated face direction. For example, in case of a frontal face, as shown in 20a of FIG. 20, a local region is clipped using parameters $a_1$, $b_1$, and $c_1$. On the other hand, in case of a left-view face, as shown in 20b of FIG. 20, a local region is clipped using parameters $a_2$, $b_2$, and $c_2$.

Japanese Patent Laid-Open No. 2004-265267 discloses a method of setting, using some directly detected feature points, other feature points. Note that in case of Japanese Patent Laid-Open No. 2004-265267, one local region is set for one feature point irrespective of directly detected feature points.

FIG. 21 is a view for explaining an example of a feature point setting method disclosed in Japanese Patent Laid-Open No. 2004-265267. As shown in 21a of FIG. 21, in case of Japanese Patent Laid-Open No. 2004-265267, only three points (A, B, C) of two inner corners of eyes and a nose are detected as feature points. Then, intersections obtained when meshes are formed using straight lines by translating those which match the respective sides of a triangle having these three points as vertices, as shown in 21a of FIG. 21, are defined as new feature points. Also, calculations are made using integer multiples of three vectors.

Furthermore, Japanese Patent Laid-Open No. 2004-265267 also discloses a method of defining, as a new feature point, a position obtained by rotating, for example, a vector CA through a predetermined angle about C. According to Japanese Patent Laid-Open No. 2004-265267, feature points can be defined at all identical positions on face images of a certain specific person by these methods. However, in practice, such characteristic feature is obtained only when variations of face images are only rotation or enlargement/reduction within an image plane.

However, the positioning methods of local regions in the above related arts suffer the following problems.

That is, in case of the method disclosed in Japanese Patent Laid-Open No. 2005-346654, since pattern matching has to be done for each of a large number of feature points, calculation cost required to determine the positions of local regions increases.

In addition, since the detection precision of feature points at positions which hardly form a specific pattern like a cheek region becomes considerably low, the number of local regions that can be used in face recognition may often be extremely small depending on image sensing conditions of input images.

In case of the method disclosed in reference 1, the setting precision of a local region changes depending on the precision of the face-direction estimation executed as pre-processing. Also, the face-direction estimation based on limited feature points is not always easy, and high calculation cost is required accordingly.

Furthermore, by changing the range to be clipped for respective local regions, an effect of setting constant ranges on an actual face to some extent irrespective of face views can be expected, while the processing load per local region becomes nonnegligible if a large number of local regions are set.

If there are face-view variations in the depth direction due to the three-dimensional structure of a face, since the shape of an identical region does not become a similar shape but it is deformed, fitting using a sole parameter has limitations.

Furthermore, in case of the method disclosed in Japanese Patent Laid-Open No. 2004-265267, new feature points calculated from detected feature points are limited to positions obtained by combining integer-multiple positions of vectors that couple respective points. Hence, intermediate positions cannot be set.

As described above, if image variations are limited to rotations (in-plane rotations) within an image plane, feature points of identical positions are more likely to be set for an identical person. However, since an image input prior to personal authentication is, in general, normalized in advance, an in-plane rotation variation is nearly corrected, and rarely poses a problem. But, variations due to rotations in the depth direction pose a problem.

For example, in a left-view face in the depth direction, as shown in 21b of FIG. 21, the triangle defined by three points deforms, and newly calculated feature points are not set at the same positions as those before rotation even for an identical person. The same problem applies to another method (the method of setting a position by rotating a line segment through a predetermined angle) disclosed in Japanese Patent Laid-Open No. 2004-265267.

SUMMARY OF THE INVENTION

The present invention has been made in consideration of the aforementioned problems.

An image processing apparatus according to the present invention comprises the following arrangement. That is, an image processing apparatus comprises: a feature point extraction unit configured to extract feature points from an image to be discriminated; a holding unit configured to hold a table which defines information required to designate a moving destination of a feature point and information required to designate a size of an image to be clipped at the moving destination for each feature point; a calculation unit configured to calculate the moving destination of each of the extracted feature points and a size of an image to be clipped at the moving destination based on a definition in the table; a clipping unit configured to clip an image with the calculated size at the calculated moving destination as a local region; and a discrimination unit configured to discriminate an image similar to the image to be discriminated using a feature amount extracted from the local region.

According to the present invention, a large number of stable local regions can be set with low calculation cost.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart showing the sequence of registration in a registration operation mode;

FIGS. 3A and 3B are flowcharts showing the sequence of discrimination in a discrimination operation mode;

FIG. 4 is a view showing practical examples of the registration;

FIG. 13 is a view showing an example of a definition table of respective local regions;

FIG. 15 is a view showing practical examples of the local region position/size calculation;

FIG. 18 is a view showing an example of a definition table of respective local regions;

DESCRIPTION OF THE EMBODIMENTS

Preferred embodiments of the present invention will now be described in detail in accordance with the accompanying drawings.

[First Embodiment]
1. Arrangement of Face Recognition Apparatus

Figure 1:
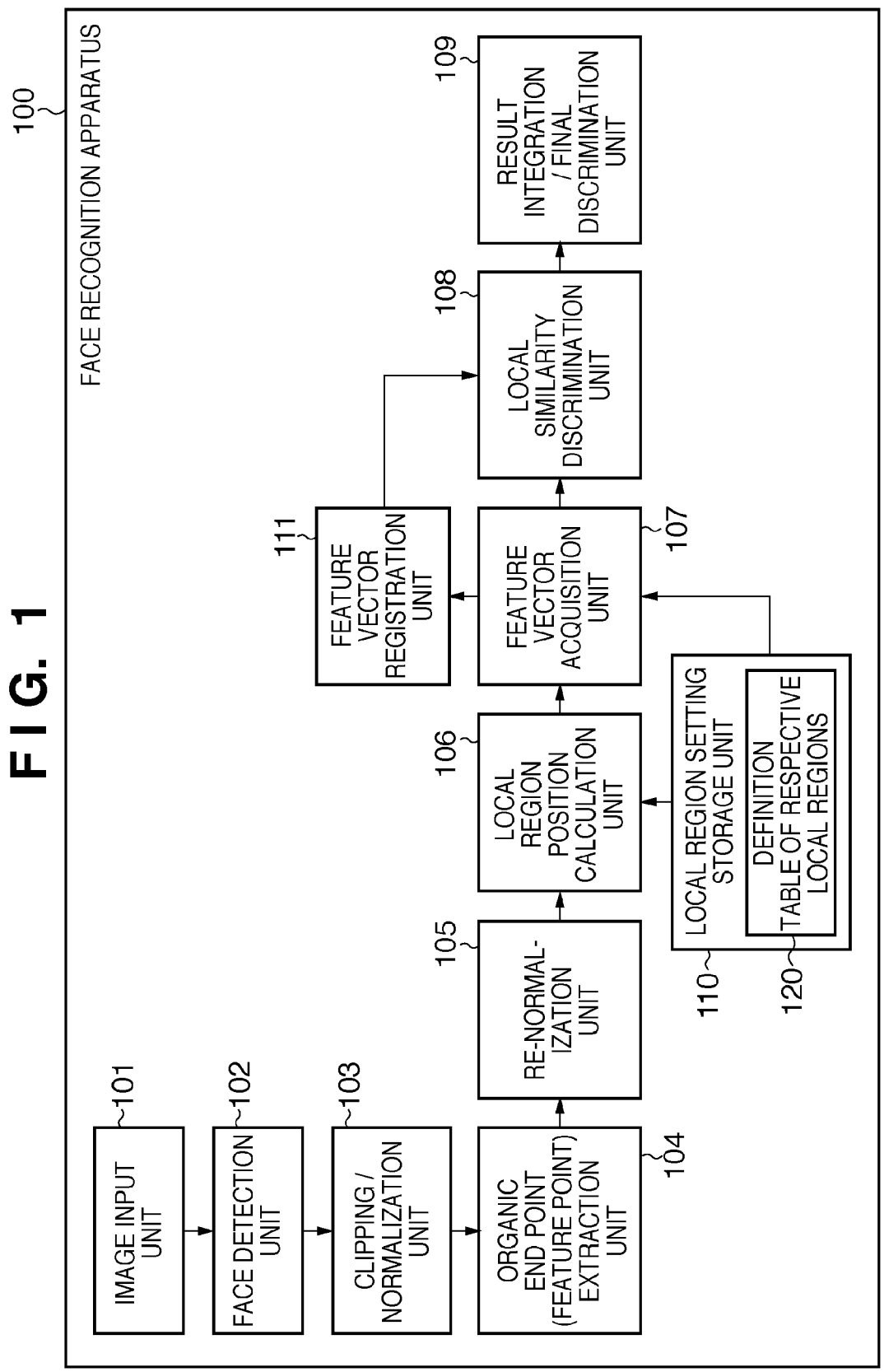
FIG. 1 is a block diagram showing the arrangement of a face recognition apparatus as the first embodiment of an image processing apparatus according to the present invention.

FIG. 1 is a block diagram showing the arrangement of a face recognition apparatus as the first embodiment of an image processing apparatus according to the present invention. Respective blocks shown in FIG. 1 are implemented, for example, as a dedicated hardware processing circuit. Note that an overview of respective blocks will be described below, and details thereof will be described later.

Reference numeral 101 denotes an image input unit, which has a function of inputting an image to be discriminated (to be referred to as a discrimination input image hereinafter), which may include a face to be identified, into the apparatus. The image input unit 101 also has a function of inputting an image (to be referred to as a registration input image hereinafter) including a face, the feature amounts of which are to be registered, in association with a personal ID, into the apparatus.

The image input unit 101 is a camera device including, for example, a photoelectric conversion device such as an optical system and CCD sensor, a driver circuit, an A/D converter, a signal processing circuit for controlling various kinds of image correction, and a frame buffer. Alternatively, the image input unit 101 may be an I/F device which receives the aforementioned images from an external device via a predetermined communication route such as a network.

Reference numeral 102 denotes a face detection unit, which executes pattern detection that detects a human face included in an input image together with information such as a position, size, and angle. The face detection unit 102 is configured using a technology disclosed in, for example, Japanese Patent Laid-Open No. 2002-358500 or P. Viola and M. Jones, "Rapid Object Detection Using a Boosted Cascade of Simple Features" (Proc. IEEE Conf. On Computer Vision and Pattern Recognition, Vol. 1, PP. 511-518, December 2001.).

Reference numeral 103 denotes a clipping/normalization unit. The clipping/normalization unit 103 clips only a face image from the input image based on the information such as a face position, size, and angle detected by the face detection unit 102, and normalizes the clipped face image to a face image having a predetermined size and angle using affine transformation.

Reference numeral 104 denotes an organic end point (feature point) extraction unit. The feature point extraction unit 104 executes processing for detecting the end points of organs such as an eye and mouth (outer and inner corners of the eyes, two end points of the mouth, and the like) as feature points, and specifying their positions. Note that the processing in this unit can use an algorithm equivalent to the pattern detection algorithm used in the face detection unit 102.

Therefore, if the processing time allows, this unit and the face detection unit 102 may use a common circuit to execute time-sharing while changing parameters. By introducing constraint conditions based on the layout of face organs, position correction and the like are executed after the pattern detection, thus obtaining more precise end point positions.

Reference numeral 105 denotes a re-normalization unit. The re-normalization unit 105 calculates transformation parameters using at least some of the feature point detection results of the feature point extraction unit 104, and executes more precise normalization. As a result, the degrees of matching of the positions and ranges of local regions which are to be set in subsequent processes can be enhanced.

Note that the processing in this unit is also based on affine transformation. Hence, this unit and the clipping/normalization unit 103 may also use a common circuit. Also, in this unit, the positions of all feature points including those which are not used in transformation parameter calculations are transformed into those on a coordinate system after the re-normalization.

Reference numeral 106 denotes a local region position calculation unit, which reads out the contents of a definition table 120 of respective local regions stored in a local region setting storage unit 110 in turn, and calculates the positions and sizes of local regions corresponding to the image to be processed.

Reference numeral 107 denotes a feature vector acquisition unit. The feature vector acquisition unit 107 acquires feature vectors of respective local regions. More specifically, this unit clips respective local regions from the image to be processed (to serve as a clipping unit), and extracts predetermined feature amounts for respective local regions. Then, this unit executes transformation of the feature amounts to acquire feature vectors.

As for extraction of the feature amounts, for example, after execution of illumination variation correction such as histogram correction, an LBP (Local binary pattern) code, Gabor feature amount, or the like is extracted using a feature amount extraction filter. The extracted feature amounts are transformed into vectors, which undergo dimension compression when they are projected onto a partial space, thus acquiring feature vectors corresponding to respective local regions.

When the feature amount extraction using an identical feature amount extraction filter is to be executed for all local regions, the extraction may be executed for the entire re-normalized face image region, and respective local regions may then be clipped. As a result, the processing load can be reduced especially when there are many overlaps of local regions.

In the registration operation mode in which a registration input image is input from the image input unit 101, feature vectors acquired by the feature vector acquisition unit 107 are stored in a feature vector registration unit 111 together with a personal ID indicating a class corresponding to the registration input image.

Note that the personal ID is designated via a user I/F or communication I/F (not shown) at the time of registration. When feature vectors based on a plurality of registration input images are to be registered in association with a certain personal ID, these feature vectors are registered in correspondence with registration input image numbers (image IDs)

uniquely assigned for each personal ID. In case of the registration operation mode, the processing is completed at this point.

Reference numeral 108 denotes a local similarity discrimination unit. The local similarity discrimination unit 108 operates in only the discrimination operation mode in which a discrimination input image is input from the image input unit 101. The local similarity discrimination unit 108 sequentially reads out the feature vectors of respective local regions of each registered personal ID (each image ID if there are a plurality of registration input images) from the feature vector registration unit 111 first.

The local similarity discrimination unit 108 calculates similarities with feature vectors of corresponding local regions of the discrimination input image, which are acquired by the feature vector acquisition unit 107. As will be described later, calculations of similarities use values based on angles (normalized correlations) between feature vectors and distances between vectors (Euclidean distances, Mahalanobis distances, or the like).

Reference numeral 109 denotes a result integration/final discrimination unit. The result integration/final discrimination unit 109 gathers similarity values for respective local regions calculated by the local similarity discrimination unit 108 for respective personal IDs (or image IDs), and integrates the similarity values by averaging or sorting out and weighting them.

The integration will be described later. The integrated similarity is called an integral similarity, and a personal ID with an integral similarity which is equal to or larger than a threshold and is largest is selected as a class of the discrimination result. When none of the similarities for all the personal IDs exceed the threshold, a face image of a non-registered person is discriminated.

When feature vectors based on a plurality of registration input images are registered in correspondence with one personal ID, the average value or maximum value, for example, of the integral similarities for all the registered image IDs is selected as the integral similarity of that personal ID. Alternatively, when the image sensing condition, face view, or the like can be estimated, a corresponding image ID may be selected.

2. Sequence of Processing in Face Recognition Apparatus

As described above, the face recognition apparatus of this embodiment has the registration operation mode and discrimination operation mode. The sequences of processing (registration and discrimination) in the respective modes will be described below.

2.1 Sequence of Registration

The registration in the registration operation mode is executed according to the flowchart shown in FIG. 2. The sequence of the registration will be described below with reference to FIG. 2. Note that a description will be given with reference to FIGS. 4 to 6 that show practical examples of the processing, as needed.

When the registration starts, the image input unit 101 inputs a registration input image as an input image in step S201. At this time, a personal ID corresponding to the registration input image is input together via a user I/F or communication I/F (not shown).

In step S202, the face detection unit 102 executes detection of a face in the registration input image (4a of FIG. 4). Details of the face detection will be described later. Note that the number of faces included in the registration input image is normally only one. However, when a registration input image including a plurality of faces is input, a face closer to the center or a larger face in the input image of the faces detected in this step is preferentially used.

In step S203, clipping/normalization for clipping a face image to have a predetermined size, and scaling the face image after rotation correction using affine transformation is executed. Parameters (affine parameters) used in this step include rotation center coordinates, a rotation angle, and variable scaling factor, which are set based on information such as a position, size, and angle of the face detected in step S202.

In this step, positions upon affine-transforming the coordinates of respective pixels within a range to be clipped (real number coordinate positions) are calculated, and corresponding pixel values are allocated at the calculated positions. Then, bilinear or bicubic interpolation, pixel integration, and the like are executed to determine pixel values after transformation (integer coordinate positions).

Alternatively, the coordinate values on an original image (real number positions) may be calculated by inversely transforming the coordinates of respective pixels after transformation, and their neighboring pixels may similarly undergo interpolation/integration. Since the processing in this step is normalization based on information with a low precision of the face detection results, a face image to be output has some variations.

In step S204, processing for detecting predetermined organic end points (feature points) from the normalized face image is executed (4b of FIG. 4).

As shown in FIG. 4, in this embodiment, a total of six points, that is, the outer and inner corners of the two eyes, and the two end points of the mouth are detected as feature points. The pattern detection algorithm used in this step is the same as that used in the face detection in step S202. In this step, assume that parameters are learned in advance so as to detect these feature points. However, since partial pattern extraction from a normalized face image is to be executed, a range to be scanned can be narrowed down to some extent.

Therefore, as incorrect answer data (corresponding to a background) that has to be separated, data around correct answer points need only be taken into consideration, and the number of variations can be greatly smaller than that of background patterns with respect to a face. That is, the calculation load on this processing is greatly lighter than that on the face detection.

In this case, although no direct pattern detection is made, midpoints between the outer and inner corners of the eyes and that between the two end points of the mouth are indirectly calculated as eye feature points and a mouth feature point, which are used as additional feature points. That is, feature points to be extracted in this step are a total of nine points.

In step S205, re-normalization is executed based on the extracted two eye positions (4c of FIG. 4). As a result of this processing, a face image on which the two eyes are moved to predetermined positions, and the size of which is scaled to a standard size, is obtained.

The affine transformation itself used in this step is the same as that in the clipping/normalization in step S203. Affine parameters are calculated so that the positions of the eyes extracted in step S204 are located at standard positions. This process will be described later.

Note that the re-normalization is applied to the face image normalized in step S203 in this embodiment. However, the present invention is not limited to such specific arrangement, and a face image may be directly normalized from the registration input image input in step S201.

In this case, affine parameters used in step S203 are stored, and the feature point coordinates detected in step S204 undergo inverse affine transformation. The obtained feature points are set as those on the coordinate system of the registration input image, and re-normalization affine parameters are calculated from these feature points.

With this processing, omission of information due to twice executions of the normalization can be suppressed, and the precision is expected to improve. However, a buffer memory used to hold the registration input image is additionally required.

As a result of the re-normalization (step S205), the two eye positions are set at predetermined standard positions. In step S206, the remaining seven feature point coordinates undergo affine transformation using the same parameters as in step S205 to calculate feature point positions on the re-normalization coordinate system (4d of FIG. 4).

Next, the control enters a processing loop for each local region. In step S207, an Index of a local region to be currently processed is determined. This Index is that of the definition table 120 of respective local regions stored in the local region setting storage unit 110, and is normally selected in turn in ascending order of Index.

After the Index of the local region to be processed is determined, the position and size of the local region are calculated using the feature point coordinates calculated in step S206 in accordance with the corresponding definition of the local region in step S208. As a result, the center coordinates and rectangle clipping size of the local region are determined. 4e of FIG. 4 shows the local region position/size calculation result (however, in the single process of this step, the center coordinates and rectangle clipping size of only one of these local regions are determined). Note that details of this processing will be described later.

In step S209, clipping an image of the local region to have a predetermined size from the face image that has undergone the re-normalization in step S205 in accordance with the determined center coordinates and rectangle clipping size of the local region is executed. Note that in this embodiment, the definition table 120 stored in the local region setting storage unit 110 defines a fixed rectangle clipping size for each local region.

In this embodiment, since the re-normalization has been executed in step S205, the sizes of the clipped face images are nearly uniform. Therefore, the range of the local region to be clipped on an actual face is not largely different if the clipping size is fixed although it slightly changes for each local region depending on the face view and the like.

In step S210, the aforementioned predetermined filtering and the like are applied to the clipped image of the local region, thereby extracting a feature amount.

Figure 5:
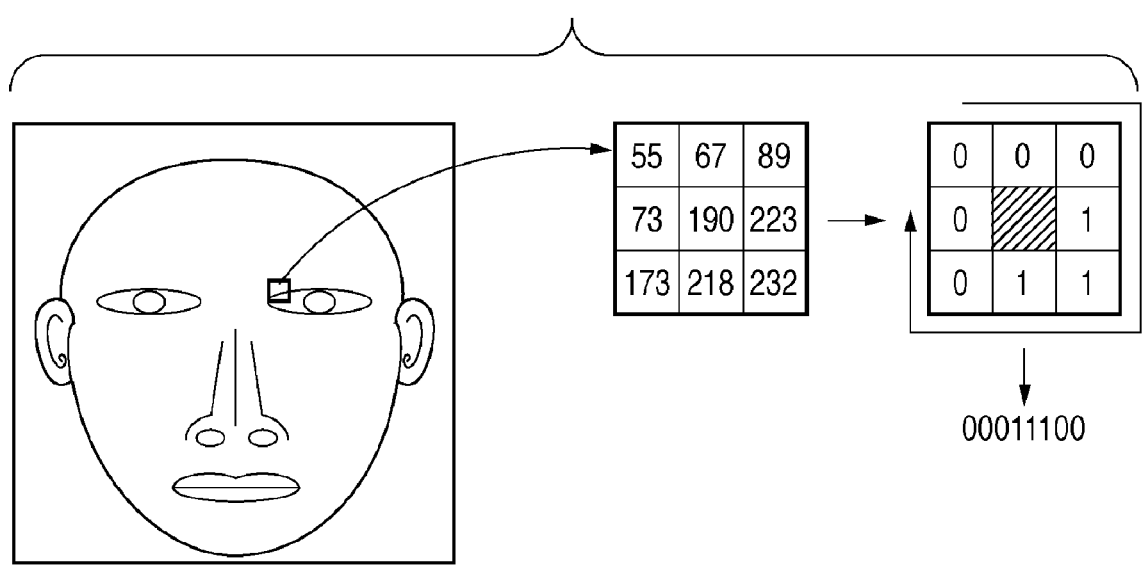
FIG. 5 is a view showing an example of an LBP code extracted as a feature amount in feature amount extraction.
Figure 6:
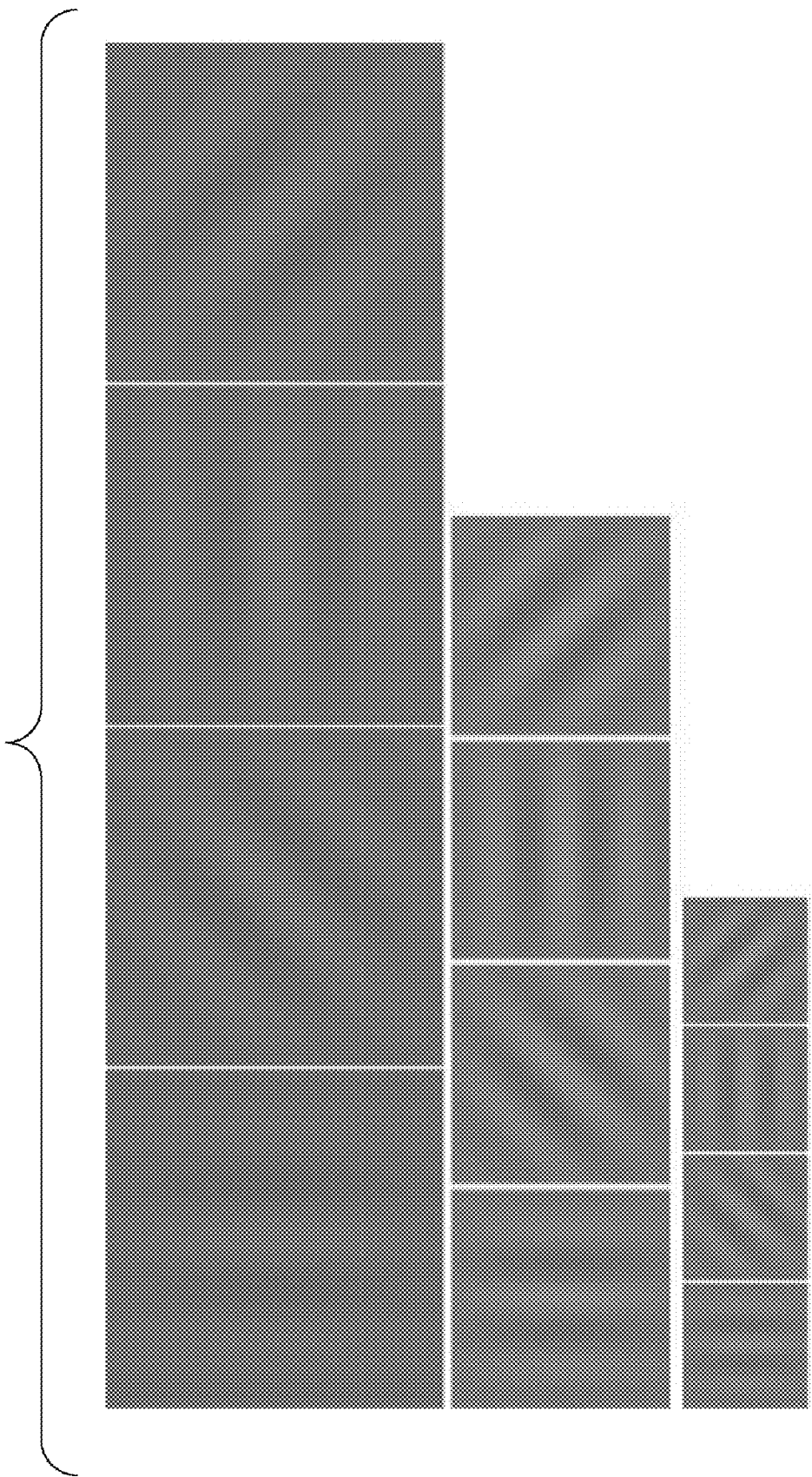
FIG. 6 is a view showing an example of Gabor jet filters used in the feature amount extraction.

The feature amount to be extracted includes, for example, an LBP code shown in FIG. 5 and a Gabor feature amount obtained by executing filtering using Gabor jet filters shown in FIG. 6.

The LBP code shown in FIG. 5 is obtained as follows. That is, a difference between the pixel values of the pixel of interest and its neighboring pixel is checked, and "0" is assigned if the difference becomes negative or "1" is assigned if it becomes positive. After that, a sequence of "0, 1" is extracted in a rotation direction from a predetermined initial point to be arranged as an 8-bit sequence, thus forming a code.

Note that the LBP code has variations such that a difference from a surrounding pixel in place of the neighboring pixel by skipping a predetermined number of pixels may be checked, pixel values corresponding to precise circle positions may be calculated by linear interpolation and may be compared, or several neighboring pixels may be averaged together and may be compared. These variations may be selectively used for respective local regions, or a plurality of types of these variations may be used together.

Referring back to FIG. 2, the feature amount extracted in step S210 includes elements as many as the number of pixels in the clipped local region (or if a plurality of types of feature amounts are used together, an integer multiple of the number of pixels). If these elements are arranged in a line to be considered as a vector, a vector has a huge number of dimensions as many as the number of pixels (or its integer multiple) of the clipped local region.

In step S211, this vector undergoes dimensional compression using a predetermined projection matrix for each local region, thus calculating a feature vector. In general, it is known that by executing dimensional compression of a feature vector, not only the data size can be reduced, but also a discrimination ratio can be improved. This is because noise and information which is not related to discrimination can be eliminated.

As a partial space expressed by each projection matrix, a space, which leaves only individual differences and eliminates differences in an identical person, that is, those caused by the image sensing conditions, face views, facial expressions, and the like, is desired. A partial space close to such ideal partial space can be calculated by executing principal component analysis (PCA) in advance using sample data of a large number of persons.

However, with the method using the principal component analysis, which of extracted principal components (eigenvectors) well expresses individual differences cannot be determined. Therefore, after all principal components are extracted, tests may be conducted using a large number of sample data whose correct answers are known, and principal components that allow satisfactory discrimination may be selected.

Alternatively, using a method called independent component analysis (ICA), if it is assumed that differences in an identical person follow the Gaussian distribution, a partial space that expresses individual differences may be directly calculated. Alternatively, a method of exploring a partial space that maximizes individual differences, and minimizes differences in an identical person by applying a method of linear discriminant analysis (LDA) is also available.

Using any of these methods, analysis and learning have to be made in advance using a large number of sample data to determine projection matrices. Such analysis and learning processes need not be executed in the face recognition apparatus 100, and may be calculated in advance using a high-spec computer, so as to store the determined projection matrices in the apparatus.

As another method, a method of determining the frequencies of occurrence of respective feature amount codes (LBP or the like) in the local region as a feature vector may be used. With this method, as in a luminance value histogram, some codes in a certain close range are counted together to reduce noise and to compress dimensions (=the number of bins of the histogram).

The feature vector extracted in this way is registered in the feature vector registration unit 111 in association with the personal ID and local region Index in step S212.

It is checked in step S213 if the processing is complete up to the definition of the last local region included in the definition table 120 of respective local regions. If the processing is not complete yet, the process returns to step S207 to execute the same processing in association with the definition of the next local region. If the processing for the definitions of all the local regions is complete, the registration for the registration input image is complete.

2.2 Sequence of Discrimination

The sequence of the discrimination in the discrimination operation mode will be described below with reference to FIGS. 3A and 3B.

In the discrimination operation mode, the image input unit 101 inputs a discrimination input image in step S301. The discrimination input image can include a plurality of faces. When the discrimination input image includes a plurality of faces, the processes after the next face detection (step S302) are executed for each of the detected faces (to avoid complexity of the flowchart, a loop corresponding to each face is not shown in FIG. 3A).

Since the processes in steps S302 to S311 correspond to steps S202 to S211 in the registration shown in FIG. 2, and the same processes are basically executed, a detailed description thereof will not be repeated.

The feature vector of the local region calculated in step S311 is held in a temporary storage area of a RAM or the like (not shown in FIG. 1) in association with the local region Index in step S312.

It is confirmed in step S313 if the processing is complete up to the definition of the last local region included in the definition table 120 of respective local regions, as in step S213.

In step S314, one personal ID to be collated currently of those registered in the feature vector registration unit 111 is selected. When feature vectors based on a plurality of registration input images are registered in association with one personal ID, one of image IDs is also selected in this step. However, a loop of each image ID is not shown in FIG. 3B.

In step S315, the Index of the local region to be collated is selected as in step S307. In step S316, the corresponding feature vector is read out from the feature vector registration unit 111.

In step S317, similarity calculation for calculating a similarity with the registered feature vector is executed with reference to the feature vector of the corresponding Index, which is temporarily stored in step S312.

Figure 7:
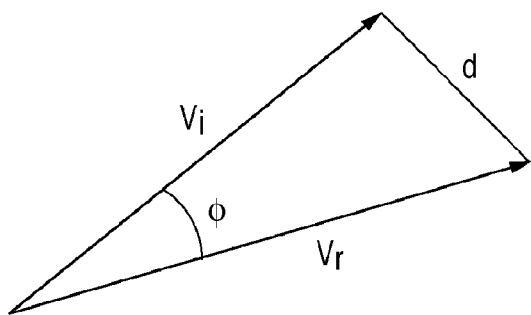
FIG. 7 is a view for explaining a calculation method of a similarity between feature vectors.

Letting $V_r$ be the registered feature vector, and $V_i$ be the feature vector extracted from the discrimination input image, the similarity can be calculated as a value based on a distance d between the two vectors, as shown in, for example, FIG. 7. It can be determined that the two vectors are more similar to each other with decreasing value of the distance d.

For example, using a square distance for the sake of easy calculations, a similarity $S_d$ can be defined by:

$$S_d = \frac{k}{k + d^2} = \frac{k}{k + (V_r - V_i)^2} \tag{1}$$

where k is a predetermined coefficient. With this definition, the similarity $S_d$ assumes a value falling within the range from 0 to 1.0. In this case, a similarity is higher as the value is closer to 1.0.

Alternatively, a similarity $S_\phi$ can be defined based on an angle φ between the vectors $V_r$ and $V_i$. In this case, for the sake of easy calculations, for example, cos φ is desirably defined as a similarity.

$$S_\phi = \cos\phi = \frac{V_r}{|V_r|} \cdot \frac{V_i}{|V_i|} = \frac{V_r \cdot V_i}{\sqrt{V_r^2}\sqrt{V_i^2}} \tag{2}$$

The similarity $S_\phi$ in this case is a normalized correlation value of the two vectors, assumes a value falling within the range from −1.0 to 1.0, and indicates a higher similarity as it is closer to 1.0. Of course, similarities based on other definitions (e.g., by combining these similarities) may be used.

It is checked in step S318 if the collation for all the local regions of the selected personal ID (or image ID) is complete, as in step S313. If the processing is not complete yet, the process returns to step S315 to repeat the processing.

On the other hand, if it is determined that the similarities of all the local regions have been calculated, integration of these similarities is executed in step S319. The most basic similarity integration is to calculate the average value (or total value) of the similarities of all the local regions as an integral similarity.

Alternatively, for example, a reliability, face view, image sensing condition, and the like may be estimated as needed, and respective local regions may be weighted or selected based on the estimation result.

When feature vectors of a plurality of image IDs are registered in association with one personal ID, the processes in steps S315 to S319 are repeated to calculate integral similarities corresponding to the respective image IDs. The integral similarities of all the image IDs for the personal ID are averaged, or a maximum value thereof is selected, thus determining the integral similarity corresponding to the personal ID.

It is checked in step S320 if the integral similarities corresponding to all personal IDs registered in the feature vector registration unit 111 have been calculated. If personal IDs to be collated still remain, the process returns to step S314 to select the next personal ID and to repeat the similarity calculation.

On the other hand, if the integral similarities for all the personal IDs have been calculated, final discrimination is executed in step S321. In this step, a personal ID with a similarity, which is equal to or larger than a predetermined threshold and assumes a maximum value, is selected. If there is no similarity equal to or larger than threshold, it is determined that the currently input discrimination input image is that of a non-registered person.

The discriminated personal ID (or a result indicating out of registration) is output to a predetermined output destination in step S322, thus ending the processing.

3. Details of Respective Processes

3.1 Details of Face Detection (Steps S202 and S302)

The face detection in step S202 in FIG. 2 and step S302 in FIG. 3A will be described below.

Figure 8:
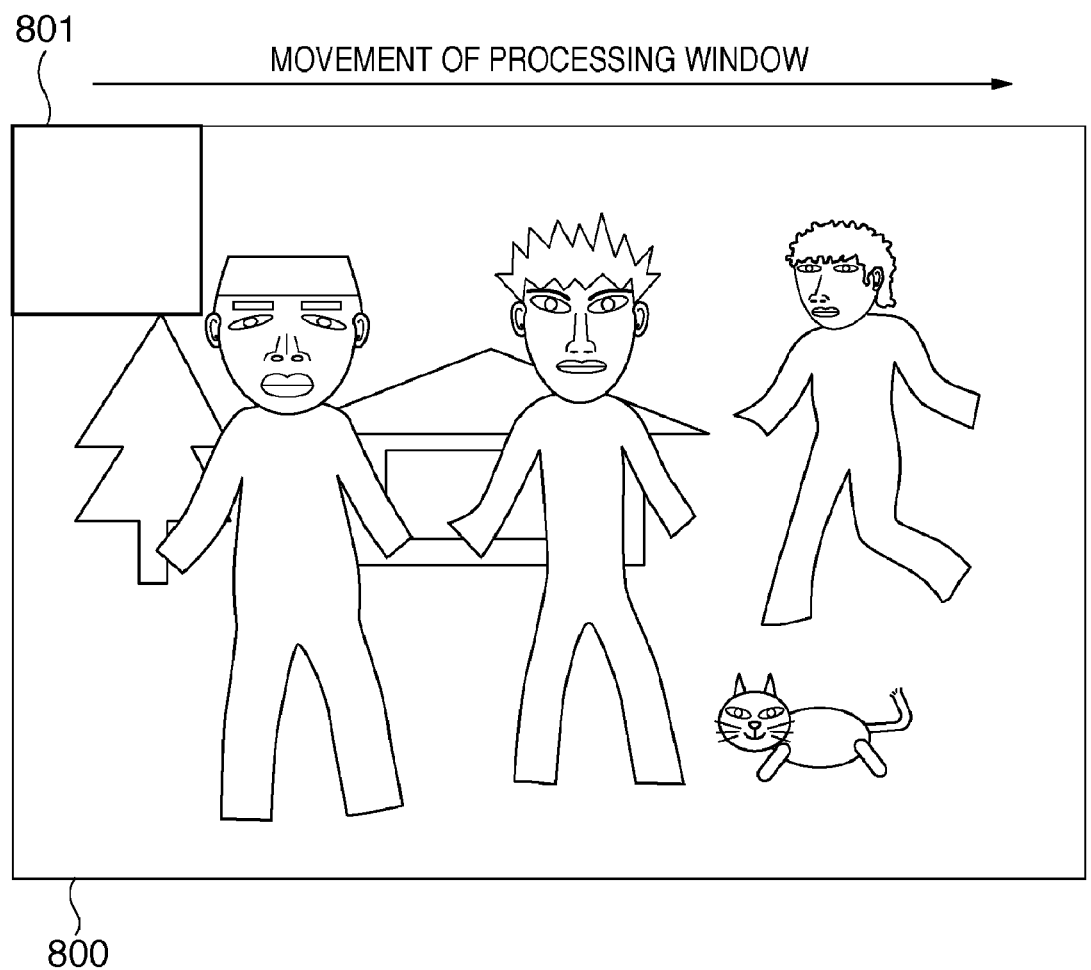
FIG. 8 is a view for explaining an example of processing window in face detection.

The face detection is implemented by moving a rectangular region 801 (to be referred to as a "processing window" hereinafter) having a specific size within an input image 800 to be processed, and checking if the processing window 801 at each moving destination includes a human face, as shown in FIG. 8. The size of this processing window 801 is set to be equal to the size of a face to be detected.

Normally, a processing window that can detect a face with a smallest size within the specification is prepared, and an input image undergoes detection at an equal size. Then, processing for generating a slightly reduced image, and applying detection to that image is repeated, thus allowing detection of a face with a size as large as possible.

Such processes are logically equivalent to use of a plurality of processing windows having different sizes. A reduction factor per process is determined depending on robustness with respect to a size that can be detected by a processing window. An input image group which is reduced little by little in this way is called pyramid images, and the size of a detected face can be specified to some extent based on the reduction factor of the input image.

A pattern detector which detects a face by applying pattern detection to an image within the processing window has certain robustness even with respect to rotation in an in-plane direction of the input image. Using a plurality of types of pattern detectors corresponding to respective angles, an in-plane rotation angle of a face can be specified to some extent.

When the input image includes a face, the face has a certain spatial distribution. For this reason, a plurality of pattern detectors output values indicating the existence of the face. Therefore, by executing integration of the outputs from the respective pattern detectors, the position, size, and rotation angle can be specified to some extent.

Figure 9:
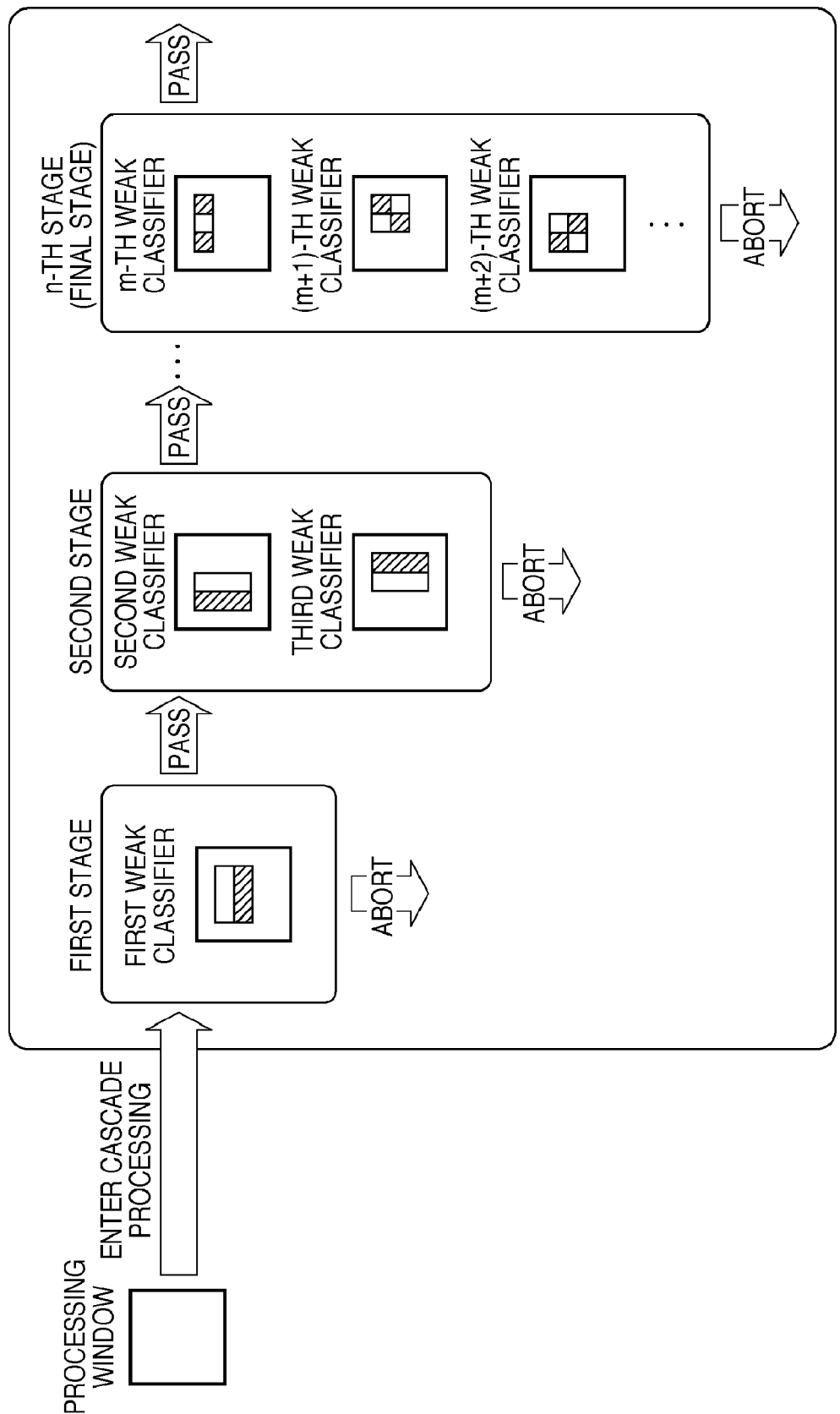
FIG. 9 is a view showing an example of a pattern detector.

An example of such face detection will be described below with reference to FIG. 9. FIG. 9 shows a pattern detector which can execute a pattern detection method disclosed in non-patent reference 2.

This pattern detector includes a plurality of stages. Weak classifiers of different combinations are assigned to the respective stages, and are processed by cascade connection to serve as a strong classifier. Each weak classifier detects a so-called Haar-like feature, and includes a combination of rectangular filters.

As shown in FIG. 9, the numbers of weak classifiers assigned to the respective stages are different. Respective stages also have the cascade-connected configurations, and execute determination in the order they are connected. In FIG. 9, the second stage executes the determination after the first stage, and the third stage then executes determination.

Each stage checks using weak classifiers of patterns assigned to itself in turn in the order assigned to itself if a processing window includes a human face. When it is determined in a certain stage that the processing window does not include any human face, the subsequent stages do not execute the determination for the processing window at that position (the cascade processing is aborted).

Only when it is determined in the final stage that a human face is included without aborting the processing, it is determined that the processing window at that position includes a human face. An actual output is a score value corresponding to an output probability of a face, and the presence/absence of a face is finally determined after execution of threshold processing and the aforementioned integration.

Assume that filters of respective stages are determined by executing machine learning in advance according to a Boosting algorithm such as AdaBoost using a large number of learning samples including normalized faces and other background data. Of course, this machine learning need not be executed in the face recognition apparatus of this embodiment, and is executed in advance using a high-spec computer or the like to store only parameters in the apparatus.

Figure 10:
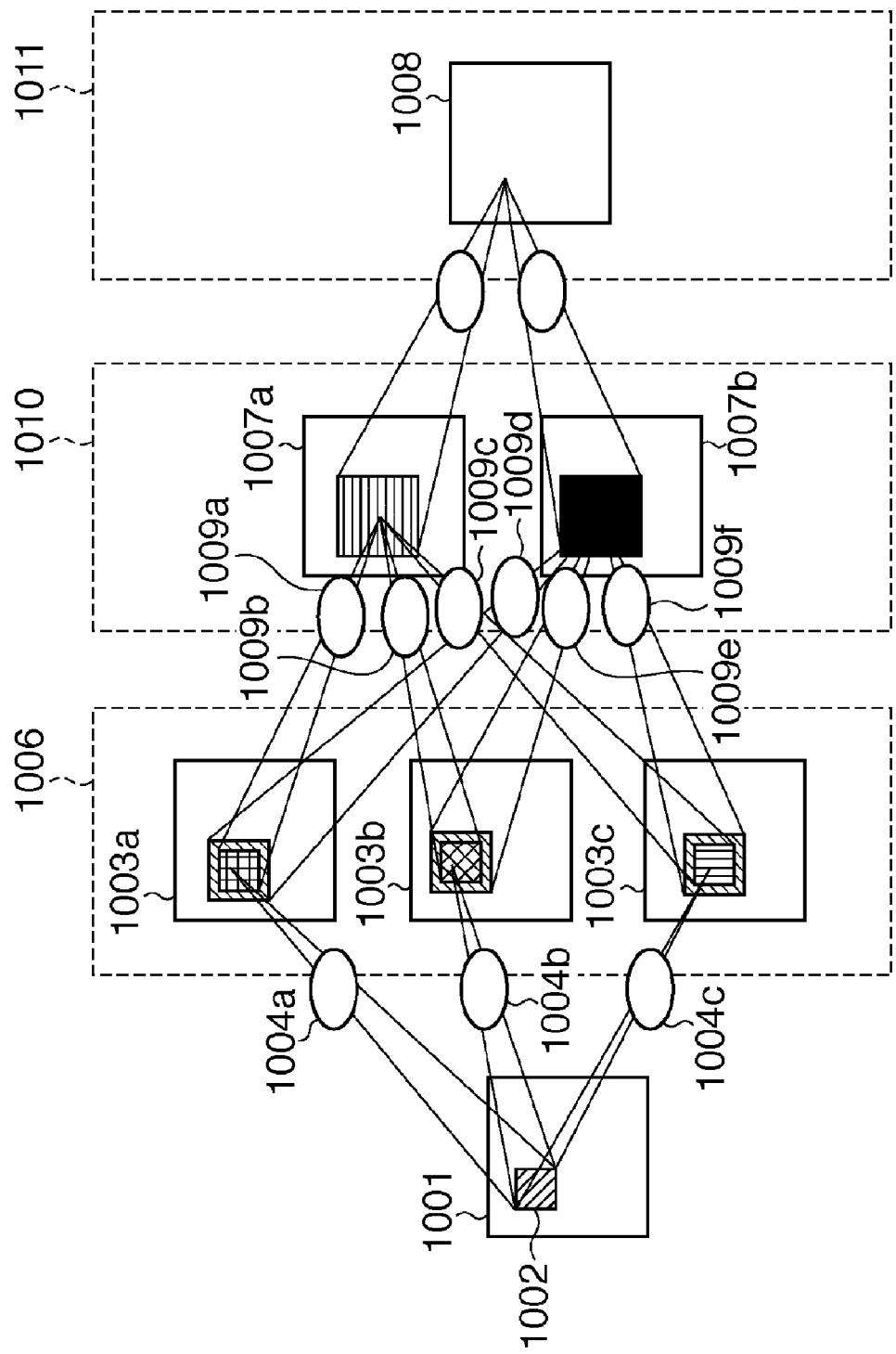
FIG. 10 is a view showing another example of a pattern detector.

The pattern detector can also be configured using a neural network, as shown in FIG. 10. FIG. 10 is a view of a logical network configuration showing an example of a neural network called Convolutional Neural Networks (to be abbreviated as CNN hereinafter).

The CNN are known as a method that allows pattern recognition robust against variations of a detection target (face in this embodiment). For example, patent reference 3 has proposed an example in which CNN hardware is applied to discrimination and detection of a target in an image.

FIG. 10 shows an example of three-layer CNN in which the number of features of a first layer 1006 is 3, and the number of features of a second layer 1010 is 2, and the number of features of a third layer 1011 is 1. Reference numeral 1001 denotes an input image.

Reference numerals 1003a to 1003c denote feature planes of the first layer 1006. The feature plane is an image data plane indicating the calculation result while scanning data of the previous layer using a predetermined feature amount extraction filter (the accumulated sum of convolution calculations and nonlinear processing).

The feature planes also express, as planes, the detection results as those with respect to an input image. The feature planes 1003a to 1003c are respectively generated by corresponding feature amount extraction filters. For example, the feature planes 1003a to 1003c are generated by two-dimensional convolution filter calculations corresponding to convolution filter kernels 1004a to 1004c, and the nonlinear transformation of the calculation results. Note that reference numeral 1002 denotes a reference image region required for the convolution calculations.

For example, a convolution filter calculation having a kernel size (the length in the horizontal direction and the height in the vertical direction) of 11×11 is processed by a product-sum calculation given by:

$$\text{output}(x, y) = \sum_{row=-rowSize/2}^{rowSize/2} \sum_{column=-columnSize/2}^{columnSize/2} \text{input}(x + column, y + row) \times \text{weight}(column, row) \quad (3)$$

where
input(x, y): a reference pixel value at coordinates (x, y)
output(x, y): a calculation result at coordinates (x, y)
weight(column, row): a weighting coefficient at coordinates (x+column, y+row)
columnSize=11, rowSize=11: a filter kernel size (the number of filter taps).

Reference numerals 1004a to 1004c denote convolution filter kernels having different coefficients. Also, the convolution kernels have different sizes depending on the feature planes.

The CNN calculations generate the feature plane by repeating the product-sum calculation while scanning a plurality of filter kernels for respective pixels, and by nonlinearly transforming the final product-sum result. Upon calculating the feature plane 1003a, since the number of interconnections with the previous layer is 1, the number of filter kernels is 1 (1004a).

On the other hand, upon calculating each of feature planes 1007a and 1007b, since the number of interconnections with the previous layer is 3, the calculation results of three convolution filters corresponding to convolution kernels 1009a to 1009c or 1009d to 1009f are accumulated. That is, the feature plane 1007a can be generated by accumulating the outputs from the convolution kernels 1009a to 1009c, and finally executing the nonlinear transformation of the result.

In this manner, in the CNN calculations, a primitive feature pattern is extracted from a lower layer first, and the spatial layout relationship of that pattern is detected in the next layer. That is, more complicated patterns can be detected toward upper layers.

Each kernel can be considered as a neuron having a large number of inputs (clipping rectangles of the previous layer). Therefore, by making learning in advance using a learning algorithm of a so-called layer neural network such as a generalized delta rule or Back propagation, coefficients (weights) can be determined. Of course, at this time, a large number of sample data including faces and backgrounds are used as in the aforementioned Boosting.

The face detection of this embodiment uses the aforementioned pattern detection technologies in combination. One face detector (coefficients thereof) can detect a face having an in-plane rotation angle within a certain range. By combining such face detectors, a face at every angle through 360° can be detected from the input image.

As described above, since the reduction factor of the input image is gradually increased, faces with various sizes can be detected.

In this manner, by integrating the outputs from a plurality of pattern detectors logically corresponding to respective sizes and respective rotation angles, not only the position of a face but also the in-plane rotation angle and size can be detected with a certain precision. By executing processing based on affine transformation (to be described later) using information of the position, size, and rotation angle calculated in this processing, the clipping/normalization in steps S203 and S303 can be implemented.

Figure 11:
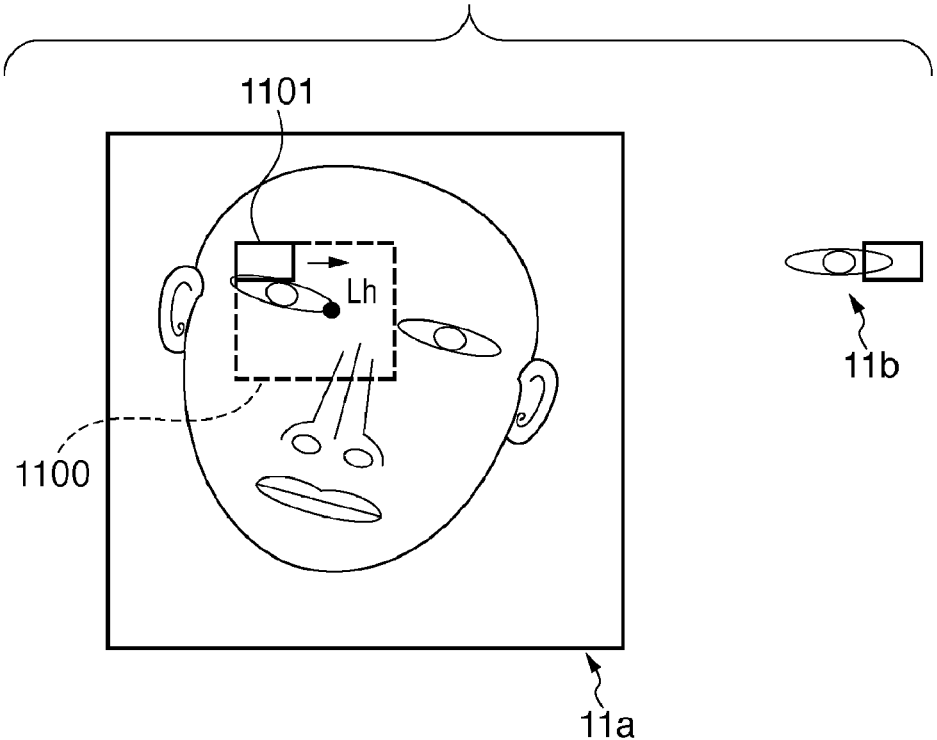
FIG. 11 is a view for explaining an example of feature point detection.

The feature point extraction in steps S204 and S304 is also executed using similar pattern detectors. FIG. 11 shows a state of extraction of the left inner corner of the eye as one of feature points of this embodiment.

11a of FIG. 11 shows a face image after the clipping/normalization. Since it is considered that the inner corner of the eye exists at a position within a nearly determined range even with some errors, a scan range for the feature point extraction can be set to be a narrow range to some extent, as denoted by, for example, reference numeral 1100. An actual range depends on the precision of the face detection.

A pattern detector for the left inner corner of the eye has learned to detect a pattern indicated by a bold frame in lib of FIG. 11. Unlike face detection, since an input image to be discriminated has only variations included in a dotted frame 1100, the pattern detector can be configured to be much simpler than that for face detection.

For example, upon using the pattern detector of the cascade-connected type, as shown in FIG. 9, the number of stages can be decreased. On the other hand, upon using the pattern detector of the CNN type, as shown in FIG. 10, the number of layers can be decreased. Even when the face detection uses the aforementioned two types in combination like in this embodiment, either one of these types is more likely to be used. In either case, hardware of the unit common to that for face detection can be used by only changing coefficients.

The output obtained from the scan range 1100 normally has a certain distribution even if it includes only pixels equal to or larger than a predetermined threshold. Hence, for example, the barycenter of the pixels equal to or larger than the threshold is determined as the position of a feature point. However, in case of this embodiment, the processing target is a face image. For this reason, since the positions of respective feature points are related to each other, after all feature point positions are temporarily extracted, they may be adjusted to each other under a geometric constraint condition, thus determining feature point positions with higher precision.

3.2 Details of Clipping/Normalization and Re-Normalization (Steps S203, S205, S303, and S305)

The clipping/normalization in steps S203 and S303 and the re-normalization in steps S205 and S305 are executed using affine transformation. Let $x_r=(x_r, y_r)$ be the coordinates of the center of rotation on a coordinate system before transformation, $\theta$ be the rotation angle, $S_x$ be the enlargement factor in the x-axis direction, and $S_y$ be the enlargement factor in the y-axis direction upon transformation of coordinates in the normalization. Also, let $x_c=(x_c, y_c)$ be the central coordinates of a face image after transformation. In this case, letting $x=(x, y)$ be the coordinates before transformation, and $x'=(x', y')$ be those after transformation, a transformation matrix can be expressed by:

$$T = \begin{pmatrix} 1 & 0 & 0 \\ 0 & 1 & 0 \\ -x_r & -y_r & 1 \end{pmatrix} \begin{pmatrix} \cos\theta & \sin\theta & 0 \\ \sin\theta & \cos\theta & 0 \\ 0 & 0 & 1 \end{pmatrix} \begin{pmatrix} S_x & 0 & 0 \\ 0 & S_y & 0 \\ 0 & 0 & 1 \end{pmatrix} \begin{pmatrix} 1 & 0 & 0 \\ 0 & 1 & 0 \\ x_c & y_c & 1 \end{pmatrix} \quad (4)$$

$$\begin{pmatrix} x' \\ y' \\ 1 \end{pmatrix} = (x, y, 1)T$$

Of the four matrices that configure the transformation matrix T, the first matrix indicates a translation of respective coordinate points by $(-x_r, -y_r)$. That is, the center of rotation $x_r=(x_r, y_r)$ is moved to an origin position. The second matrix indicates a rotation through $\theta$ about the origin (clockwise=positive). The third matrix indicates an enlargement from the origin to a coordinate position enlarged $S_x$ times in the x-axis direction and $S_y$ times in the y-axis direction. The fourth matrix is a translation matrix which is the same as the first matrix, and indicates a translation of the origin to the central coordinates $x_c=(x_c, y_c)$ of the final image after transformation. That is, the transformation matrix T attains these four movements in combination.

The normalization (or re-normalization) aims at calculations of luminance values of all pixels of the face image after transformation. In order to implement such calculations, transformation (inverse transformation) using an inverse matrix $T^{-1}$ of the transformation matrix T can be applied to respective pixel coordinates (origin to $(2x_c, 2y_c)$) after transformation. As a result, the position coordinates on the coordinate system of the face image before transformation are determined. Normally, since the coordinates calculated in this processing assume real number values, each of which does not correspond to one pixel (integer coordinate position) before transformation, pixel values are determined from neighboring pixels using linear interpolation or the like, so as to obtain pixel values after transformation.

Respective affine parameters in the clipping/normalization in steps S203 and S303 are determined based on the output from the face detection unit 102. That is, letting $\Psi$ be some in-plane rotation angles that can be detected by the face detection unit 102, the above parameter $\theta=\Psi$. Then, the center of rotation $x_r=(x_r, y_r)$ becomes the central point of the processing window 801 described using FIG. 8. The variable scaling factor $S_x=S_y$ is that (enlargement/reduction factor) which enlarges or reduces the size of the detected face to a standard size.

Figure 12:
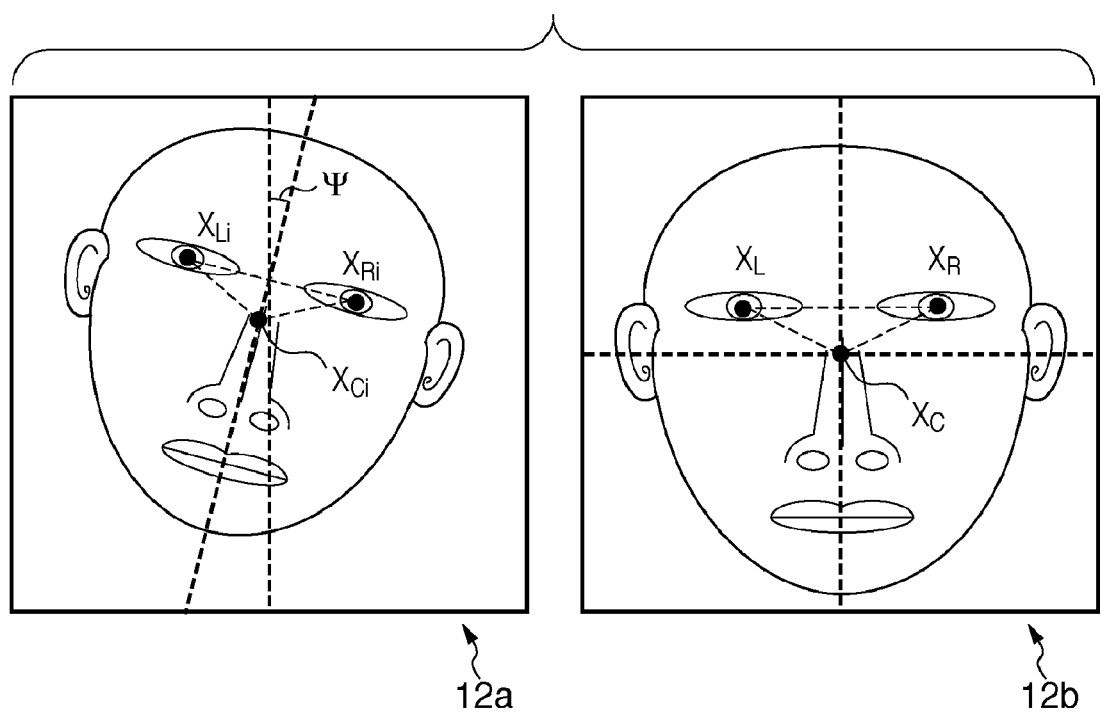
FIG. 12 is a view for explaining a calculation method of affine parameters used in re-normalization.

In the re-normalization in steps S205 and S305, affine parameters are determined based on the positions of the two eyes extracted in the feature point extraction in steps S204 and S304. FIG. 12 is a view for explaining the calculation method of the affine parameters at this time.

12a of FIG. 12 shows a face image from which feature points are extracted. Reference symbols $X_{Li}$ and $X_{Ri}$ denote position vectors of the two eyes extracted as feature points. Also, reference symbol $x_{Ci}$ denotes the center of rotation before transformation. 12b of FIG. 12 shows a face image after re-normalization. Reference symbols $X_L$ and $X_R$ denote position vectors of the two eyes after transformation, which assume constant coordinate values, since re-normalization is executed to set these positions at predetermined positions. Also, reference symbol $X_C$ denotes the central position of the image after re-normalization, which also assumes a constant coordinate value.

The positions $X_L$ and $X_R$ are horizontal to each other (i.e., have an equal y-coordinate), and the x-coordinate of the position $X_C$ is equal to the midpoint between the positions $X_L$ and $X_R$. Letting a be the difference between the y-coordinates of the positions $X_C$ and $X_L$ assuming the distance between the positions $X_L$ and $X_R$ (the difference between x-coordinates) is 1, the difference a can be calculated from the constant coordinates. In this embodiment, a triangle having the positions $X_{Li}$, $X_{Ri}$, and $X_{Ci}$ as vertices is similar to that having the positions $X_L$, $X_R$, and $X_C$ as vertices. Therefore, it is obvious that the center of rotation $X_L = X_{Ci}$ before transformation for re-normalization can be calculated from the coordinate values of the positions $X_{Li}$ and $X_{Ri}$ and the difference a.

In consideration of a vector $(X_{Ri}-X_{Li})$, a rotation angle $\Psi$ of the face can be calculated from a normal vector to that vector. More specifically, a rotation amount $\theta = -\Psi$ for re-normalization can be calculated. Furthermore, in this embodiment, since a common variable scaling factor is used in the vertical and horizontal directions, a variable scaling parameter $S_x = S_y$ can be calculated as a ratio between the lengths of $(X_{Ri}-X_{Li})$ and $(X_R-X_L)$. Of course, the center coordinates $X_{Ci} = X_C$ of the face image after transformation.

3.3 Details of Local Region Position/Size Calculation (Steps S208 and S308)

Details of the local region position/size calculation in steps S208 and S308 will be described below with reference to FIGS. 13, 14 and 15.

Figure 14:
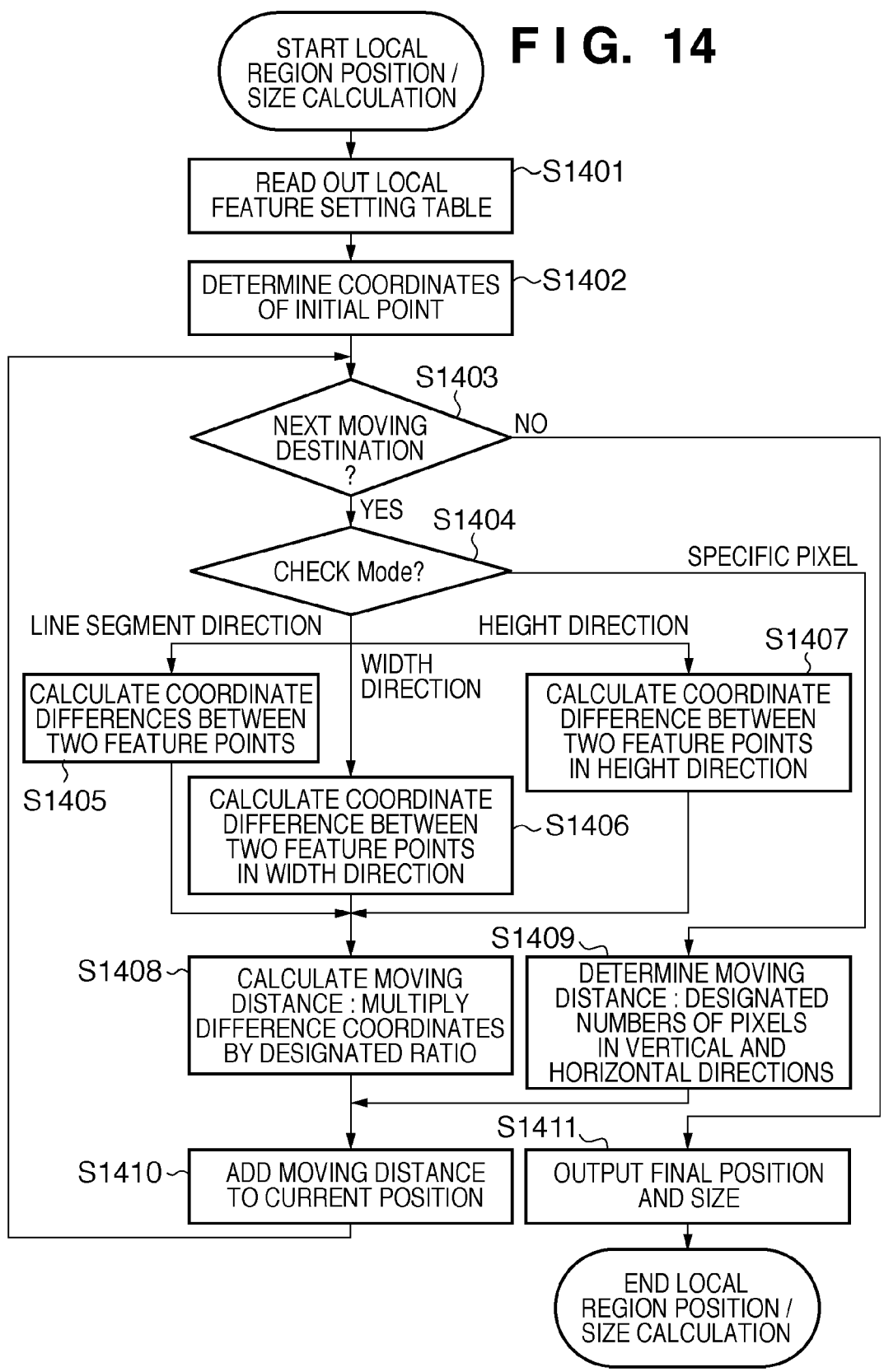
FIG. 14 is a flowchart showing the detailed sequence of local region position/size calculation.

FIG. 14 is a detailed flowchart of the local region position/size calculation.

In step S1401, the definition (local feature setting) of the local region to be currently calculated is read out based on the given local region Index. Assume that the local region Index is selected in step S207 or S307.

The definition table 120 of respective local regions is stored in the local region setting storage unit 110 in FIG. 1, and FIG. 13 shows an example of that table. Note that FIG. 13 shows only settings of some local regions for the sake of simplicity. However, assume that more local regions are set in practice.

In fact, a feature Index and local region Index have the same meaning. Since a feature vector is finally extracted from each local region, the local region Index is used intact as the Index of the feature vector to be extracted. Since not only the position calculation methods and sizes of local regions but also the types of feature amounts and projection matrices for dimension compression are set in this definition table 120, the definition table 120 will be referred to as a "local feature setting table" hereinafter.

In the local feature setting table 120, a feature point used as an initial point is defined as the position of a local region. As the initial point, any of points extracted as feature points can be designated. For example, in a local region with Index=1, the left outer corner of the eye is designated as an initial point. In a local region with Index=2, the left inner corner of the eye is designated as an initial point. Of course, like the mouth position in a local region with Index=5, a feature point other than those which are directly detected of the aforementioned nine feature points can be designated. Furthermore, a feature point calculated from a plurality of feature points may be set as an initial point like "midpoint between two eyes" designation in a local region with Index=3.

Next, a calculation method of a first moving destination from an initial point is defined. More specifically, a calculation method (Mode), feature points (From, To) as references of moving distance calculations, and a ratio (Ratio) are designated. Likewise, a calculation method of a second moving destination is defined. Note that the number of definitions of moving destinations is not limited to two, but any number of definitions of moving destinations can be defined for each Index. Also, as exemplified in local regions with Index=2 and 3 in the local feature setting table 120 in FIG. 13, the number of definitions of moving destinations may be one or no moving destination definition may be set. For example, when no moving destination definition is set like in a local region with Index=3, the position of that local region is that of the midpoint itself between the two eyes (feature point) designated as an initial point.

Furthermore, in the local feature setting table 120, the clipping size of a rectangle of a local region is set. In this embodiment, the clipping size is fixed for each local region. Note that the position of a local region determined as a moving destination from an initial point indicates the central coordinates of the rectangle clipped as the local region.

In addition, in the local feature setting table 120, the types of feature amounts to be extracted (types of filters) and projection matrices for the dimension compression are defined. In this embodiment, as described above, since the LBP code specified by eight neighboring pixels shown in FIG. 5 is used in all local regions, the types of feature amounts to be extracted designated by all Indexes are the same. In such case, the feature amount extraction in step S310 in FIG. 3A may be executed for the entire image region in advance, and images to be clipped in step S309 may use those after transformation, thus often improving the processing efficiency (especially, when there are many overlaps of local regions).

Since the projection matrix is acquired by learning for each local region, as described above, different projection matrices are stored in all the Indexes. In the local feature setting table 120 in FIG. 13, the projection matrices are indicated by symbols that express matrices (P1 and the like) for the sake of simplicity, but element values of the matrices may be directly written in this table.

In fact, in each projection matrix of the local feature setting table 120 in FIG. 13, the first term of numerals in parentheses indicates the number of dimensions of a vector before projection, and corresponds to the number of pixels of the acquired local region. The second numeral indicates the number of dimensions after projection. For example, in a local region with Index=1, a projection matrix P1 is (a transposed matrix of) 169×8.

The description will revert to FIG. 14. In step S1402 in FIG. 14, the coordinates of an initial point are determined in accordance with the readout local feature setting table 120. The coordinates of the initial point defined as the initial point in the local feature setting table 120 are selected from those of feature points transformed in step S206 or S306. Or in case of designation to calculate from a plurality of feature points like Index=3 in FIG. 13, the coordinates of the initial point are calculated in this step.

It is checked in step S1403 if the definition of a moving destination is included. If the definition of a moving destination is included, the process advances to step S1404 to check the calculation method (Mode). As the calculation method (Mode), there are four modes, that is, "SlideLine", "SlideWidth", "SlideHeight", and "SlidePixel", as shown in FIG. 13.

"SlideLine" is a mode which designates to move a line segment that couples between "From" and "To" as feature points as references for the moving distance calculations in a direction from "From" to "To", and a moving distance is calculated by multiplying the line segment by a ratio (Ratio) that divides the line segment proportionally. Since a decimal number can be designated as "Ratio", a local region can be allocated at an intermediate position. As this ratio value, a positive or negative non-integer value can be designated. When a negative value is designated as "Ratio", the moving direction is reversed to a direction from "To" to "From" (the initial point is left unchanged).

"SlideWidth" is a mode which designates to move by a distance calculated based on a difference length in the x-axis direction (horizontal component) between "From" and "To" as feature points as references for the moving distance calculations in only the x-axis direction. At this time, a direction from the position of "From" in the x-axis direction to that of "To" in the x-axis direction is the positive direction. Using "Ratio" that allows to designate a value below the decimal point, a ratio of a moving distance with respect to the difference length can be designated.

Likewise, "SlideHeight" is a mode which designates to move by a distance calculated based on a difference length in the y-axis direction (vertical component) between "From" and "To" as feature points as references for the moving distance calculations in only the y-axis direction.

"SlidePixel" is a mode which designates to move by the fixed number of pixels.

The process advances to one of steps S1405, S1406, S1407, and S1409 according to the mode confirmed in step S1404.

In case of "SlideLine", the process advances to step S1405, and the coordinate differences between "From" and "To" as feature points as references for the moving distance calculations are calculated (to subtract the x- and y-coordinate values of "From" from those of "To", respectively).

In case of "SlideWidth", the process advances to step S1406, and the coordinate difference in the x-axis direction between "From" and "To" as feature points as references for the moving distance calculations is calculated (the coordinate difference in the y-axis direction is set to be zero).

In case of "SlideHeight", the process advances to step S1407, and the coordinate difference in the y-axis direction between "From" and "To" as feature points as references for the moving distance calculations is calculated (the coordinate difference in the x-axis direction is set to be zero).

After execution of one of steps S1405 to S1407, the process advances to step S1408, and a value or values obtained by multiplying the coordinate difference or differences by the designated ratio (Ratio value) is or are calculated as a moving distance or distances.

In case of "SlidePixels", the process jumps to step S1409, and the readout numbers of pixels in the x- and y-axis directions are determined intact as moving distances.

After the moving distance or distances is or are determined by the processes in steps S1405 to S1409, the moving distance or distances are added to the current position coordinates in step S1410. The process then returns to step S1403.

If it is determined in step S1403 that no definition of a moving destination remains, the process jumps to step S1411 to output the determined position and size (a fixed value defined in the local feature setting table 120 in this embodiment), thus ending the processing.

FIG. 15 is a view showing a state of the local region position/size calculation based on the definition of Index=1 in the local feature setting table 120 shown in FIG. 13. 15a of FIG. 15 shows a state of the local region position/size calculation in case of a frontal face image.

In Index=1, an initial point is the left outer corner of the eye (LeftEyeTail) (note that in this embodiment, the eye on the observer's left side is described as "LeftEye" in place of the actual left eye of a face).

In moving destination 1, the "SlideLine" mode is designated as the calculation method. At this time, "From" is "LeftEyeTail", and "To" is "RightEyeTail". That is, moving destination 1 ((1)) designates that the length of a line segment that couples the right and left outer corners of the eyes is assumed to be 1, and a point is moved by a moving distance obtained by multiplying the length by Ratio=0.2 from the left outer corner of the eye as the initial point. In this way, the same feature point can be designated as the initial point and "From". Of course, quite different feature points (for example, the two end points of the mouth) can also be designated.

In moving destination 2, the "SlideHeight" mode is designated as the calculation method. "From" is the right eye (RightEye), and "To" is the mouth position (Mouth). However, since the height of the right eye is equal to that of the left eye as a result of re-normalization, a moving destination based on the difference between the heights of the eye and mouth is designated in practice. Since this mode designates a movement in only the height direction, a point is moved from the position after movement of (1), as indicated by (2), and this is the finally determined position of the local region.

Note that the number of times of definitions of moving destinations is not limited to two, and moving destinations can be defined an arbitrary number of times. Then, the moving processes as many as the number of times defined in the table are executed, thus determining the final position.

15b of FIG. 15 shows a state of the local region position/size calculation based on the same definition of Index=1 for a slightly left-view (called left-depth-rotated) normalized face image. On the left-depth-rotated face image, the distances from the image sensing device to the right and left eyes are different, and a line segment that couples the right and left eyes is slant in the depth direction when viewed from the image sensor plane. Hence, this face image is sensed so that the distance between the two eyes seems to be smaller than the actual distance.

Therefore, upon execution of normalization with reference to the two eye positions as in this embodiment, the obtained face image is slightly larger than a frontal face image, and the mouth position slightly lowers. Therefore, the moving distance ((2)) based on the definition of moving destination 2 in Index=1 is slightly larger than that in 15a of FIG. 15. However, as can be seen from 15a and 15b of FIG. 15, the positions of the local region on the faces are nearly the same in 15a and 15b of FIG. 15.

The aforementioned local feature setting table 120 can be determined by learning in advance using a large number of sample data whose classes are given. This learning can be implemented by preparing a large number of candidates of local regions in advance, and selecting a combination of local regions with a highest accuracy rate by a round-robin method for all combinations of local regions up to the upper limit required for class discrimination.

Variations of candidates of local regions at this time are combinations of, for example, initial points for positioning and ratios used to calculate moving distances, the shapes and sizes of local regions. A combination of local regions may be selected by combining algorithms such as existing Boosting and clustering. Also, a manual empirical selection method is effective.

As can be seen from the above description, according to this embodiment, a local region can be determined at a nearly stable position on a face without any face view estimation. Also, since the entire face undergoes re-normalization together, a local region can be clipped so as to have a nearly constant range on an actual face. This re-normalization normally imposes a lighter load than variable scaling for each local region.

[Second Embodiment]

In the first embodiment, the face recognition apparatus is implemented by a hardware processing circuit. However, the present invention is not limited to such specific embodiment. For example, the face recognition apparatus may be implemented using a general-purpose CPU.

Figure 16:
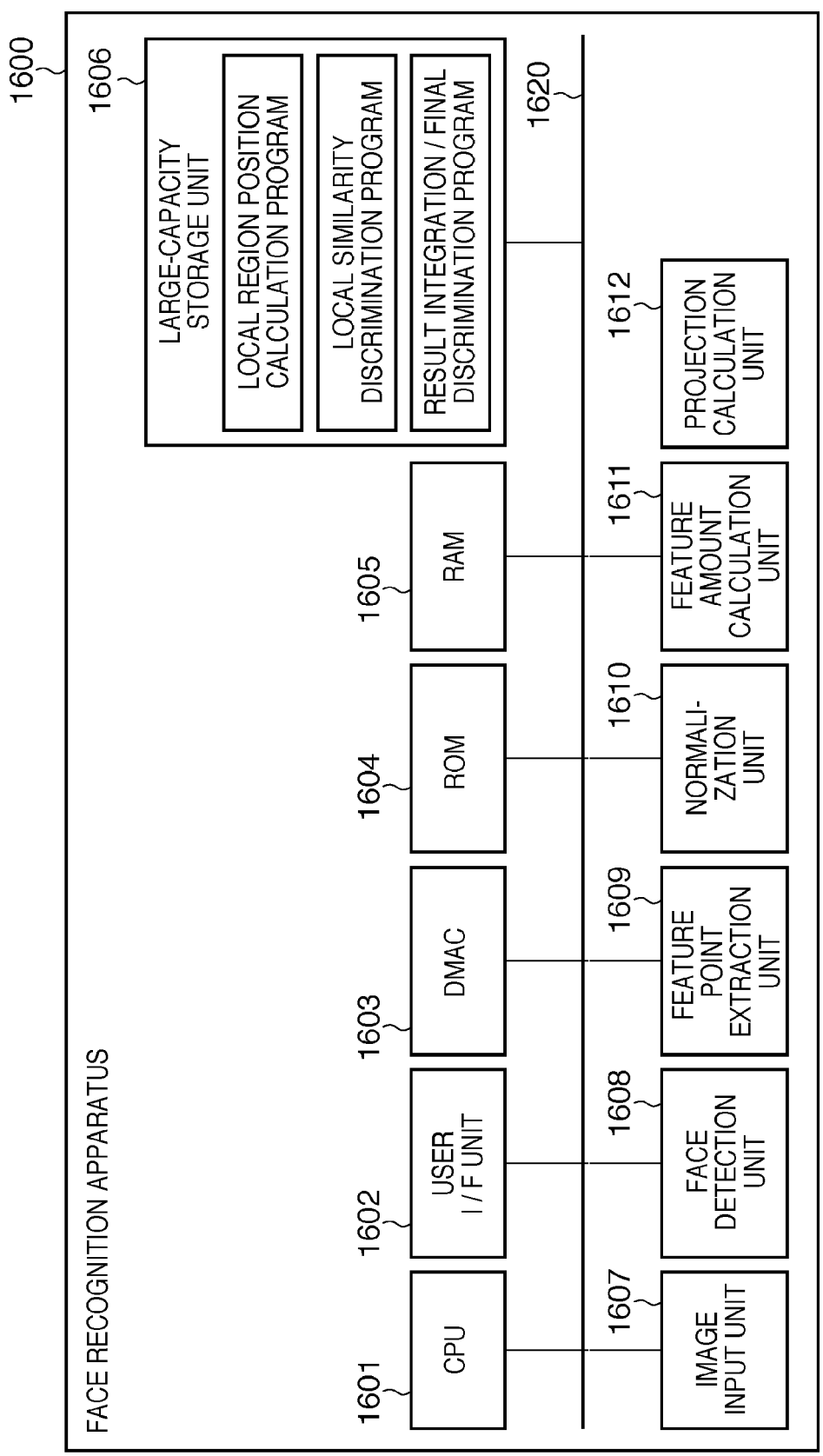
FIG. 16 is a block diagram showing the arrangement of a face recognition apparatus as the second embodiment of an image processing apparatus according to the present invention.

FIG. 16 is a block diagram showing a face recognition apparatus 1600 according to the second embodiment of an image processing apparatus of the present invention. As shown in FIG. 16, the face recognition apparatus according to this embodiment operates when a CPU 1601 controls respective units connected via a bus 1620. Respective units will be described below.

Reference numeral 1602 denotes a user I/F unit, which is used to allow the user to input instructions to the face recognition apparatus 1600 and to inform the user of the discrimination result. Instructions input via this user I/F unit 1602 are sent to and interpreted by the CPU 1601 and serve as triggers for subsequent processes.

Reference numeral 1603 denotes a DMAC. The DMAC 1603 can execute data transfer among the respective units without going through the CPU 1601 when the CPU 1601 sets the DMAC 1603 in advance.

Reference numeral 1604 denotes a ROM, which stores programs to be executed by the CPU 1601 and fixed parameters required for processes.

Reference numeral 1605 denotes a RAM, which is used as a work area upon execution of respective processes, and a temporary data storage area. Note that an internal local RAM (not shown) may be used for respective processes independently of the RAM 1605.

Reference numeral 1606 denotes a large-capacity storage unit which includes a hard disk drive (HDD). The large-capacity storage unit 1606 stores programs for executing the processing contents in the local region position calculation unit 106, local similarity discrimination unit 108, and result integration/final discrimination unit 109.

Reference numeral 1607 denotes an image input unit, which corresponds to the image input unit 101 in FIG. 1. The image input unit 1607 includes an I/F that can be connected to the bus 1620. The operation of the image input unit 1607 is the same as that of the image input unit 101, and an input image is stored in the RAM 1605 or large-capacity storage unit 1606 via the bus 1620. Note that transfer of images is executed using the DMAC 1603.

Reference numeral 1608 denotes a face detection unit, which corresponds to the face detection unit 102 in FIG. 1. The processing executed in the face detection unit 1608 is the same as that in the first embodiment, and realizes high-speed processing since the face detection unit 1608 is implemented as dedicated hardware. Note that a discrimination input image to be input is stored on the RAM 1605, and is partially transferred by the DMAC 1603 according to a processing status.

Reference numeral 1609 denotes a feature point extraction unit, which corresponds to the feature point extraction unit 104 in FIG. 1. The feature point extraction unit 1609 may use hardware common to the face detection unit 1608, and parameters may be switched in response to instructions from the CPU 1601 if processing time allows and no pipeline processing is required.

Reference numeral 1610 denotes a normalization unit, which executes processing equivalent to the clipping/normalization unit 103 and re-normalization unit 105 in FIG. 1. More specifically, the normalization unit 1610 executes normalization of a face image using affine transformation described in the first embodiment.

Reference numeral 1611 denotes a feature amount calculation unit, which executes some of processes executed by the feature vector acquisition unit 107 in FIG. 1. The feature amount calculation unit 1611 executes filtering for calculating an LBP code shown in FIG. 5 as a feature amount, or filtering for calculating a Gabor feature amount using Gabor jet filters shown in FIG. 6.

Reference numeral 1612 denotes a projection calculation unit, which executes dimension compression of a feature amount of each local region using a predetermined projection matrix. The projection calculation unit 1612 executes some of processes executed by the feature vector acquisition unit 107 in FIG. 1.

In addition, the local region setting storage unit 110 and feature vector registration unit 111 in FIG. 1 are implemented using partial areas of the RAM 1605 or large-capacity storage unit 1606.

Note that the programs which are stored in the large-capacity storage unit 1606 and are required to execute the processing contents of the local region position calculation unit 106, local similarity discrimination unit 108, and result integration/final discrimination unit 109 are executed by the CPU 1601.

Figure 3B:
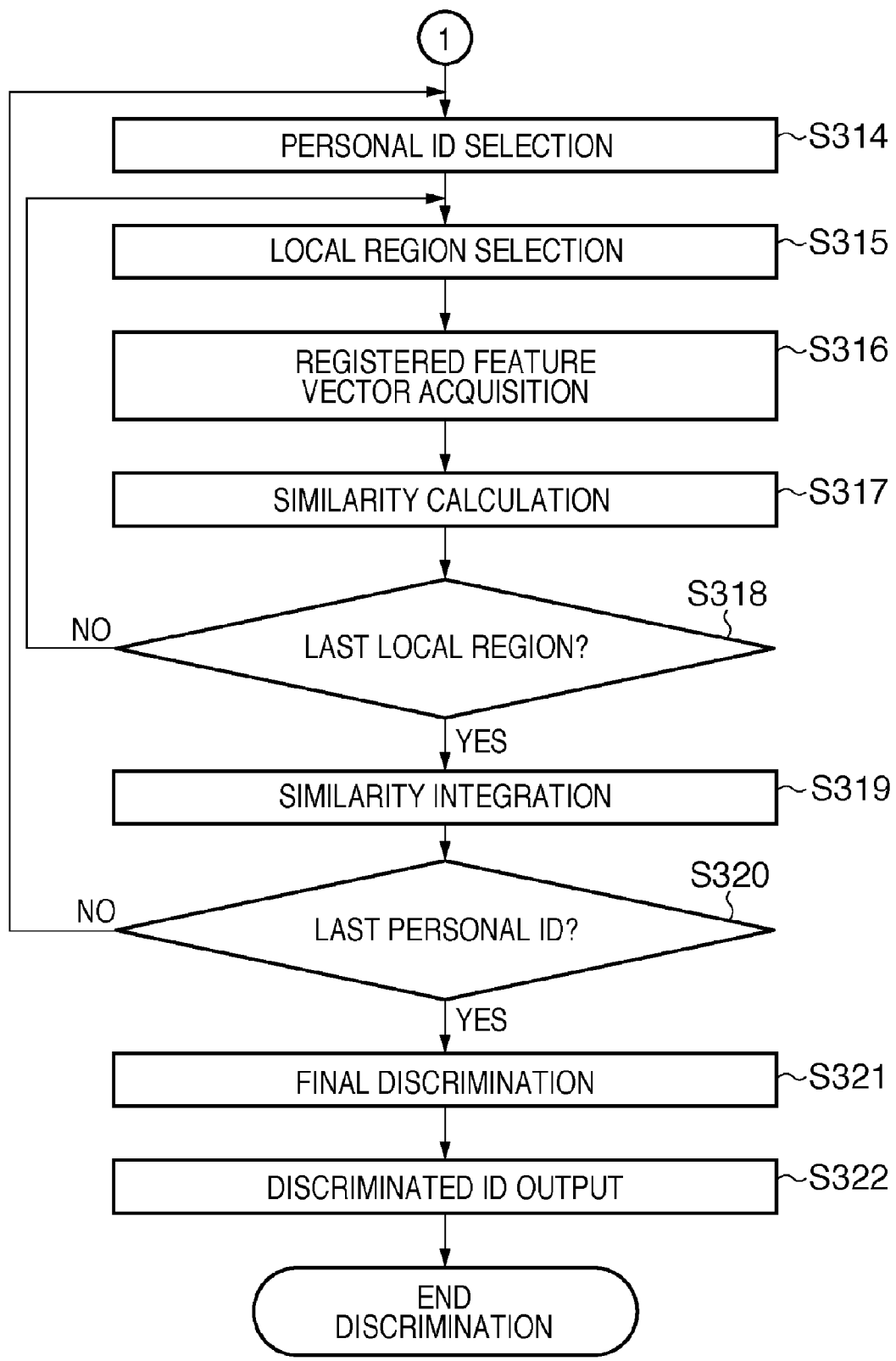

The sequences of the registration and discrimination executed by the face recognition apparatus 1600 are the same as those shown in FIGS. 3A and 3B and FIG. 4, and a detailed description thereof will not be repeated.

As can be seen from the above description, upon configuring the face recognition apparatus using the general-purpose CPU, processes such as calculations of similarities and integration of the similarities can be customized after completion of hardware, and a more flexible face recognition apparatus can be configured.

Furthermore, by replacing parameters, discrimination of other images in place of faces, for example, that of models of cars, can be implemented. Of course, when a CPU having sufficiently high processing performance (e.g., a high-spec CPU) is available, all processes may be executed using software without incorporating any dedicated hardware components 1607 to 1612.

[Third Embodiment]

In the local region position/size calculation of the first embodiment, each local region uses the fixed size. However, the present invention is not limited to this, and the size of a local region to be clipped may be determined as a variable value based on feature points.

Figure 17A:
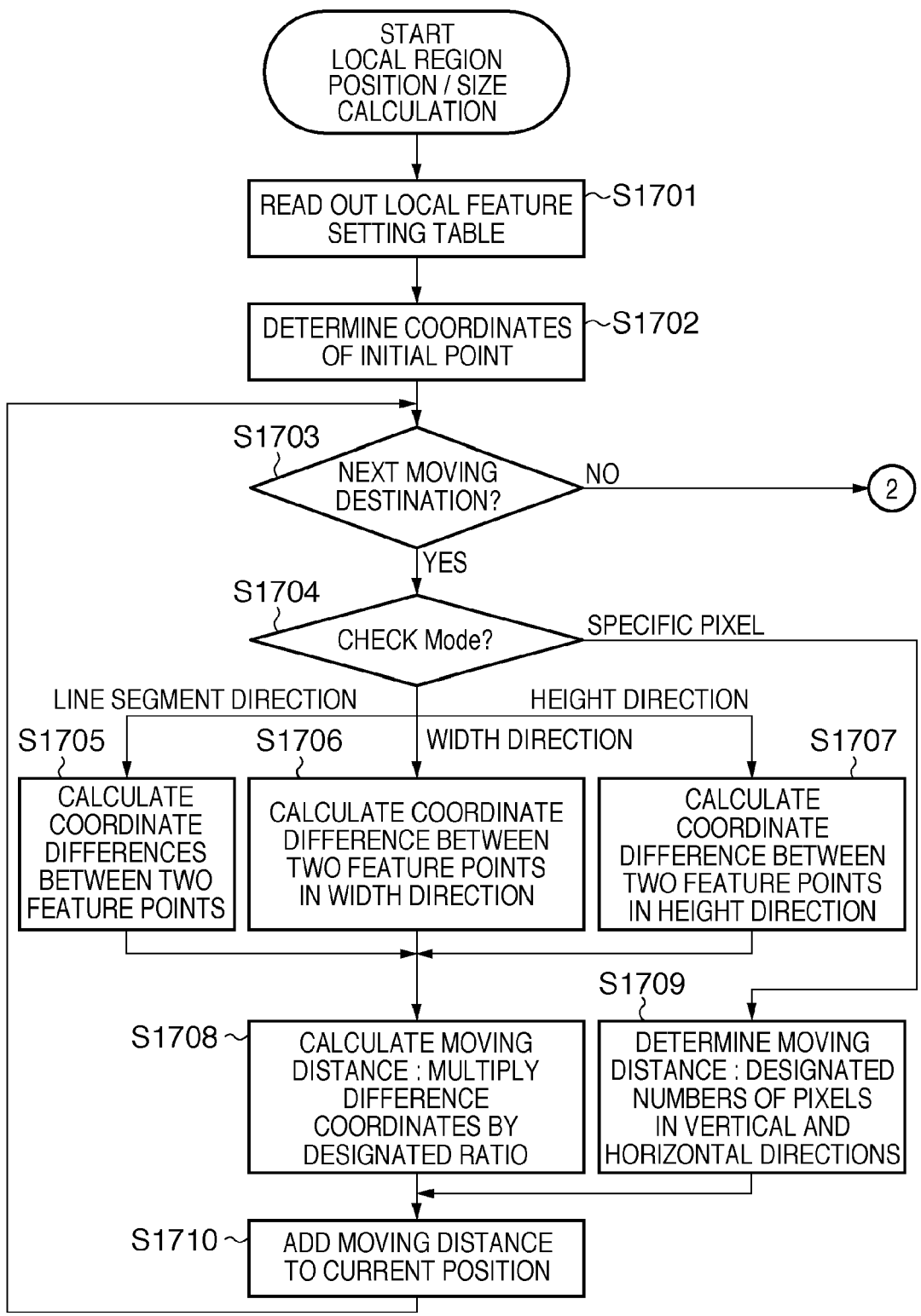
FIGS. 17A and 17B are flowcharts showing the sequence of local region position/size calculation of a face recognition apparatus as the third embodiment of an image processing apparatus according to the present invention.
Figure 17B:
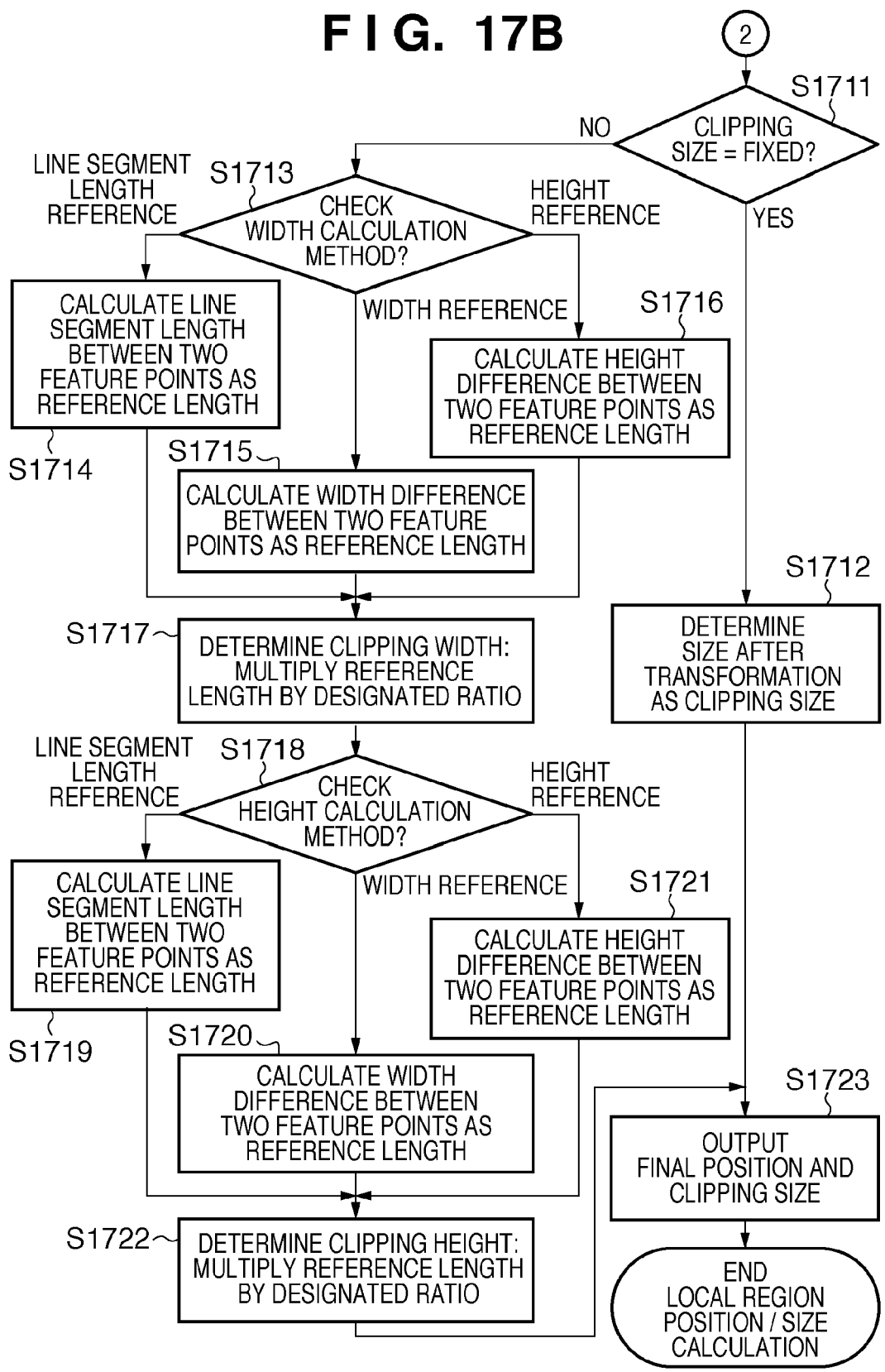
Figure 19:
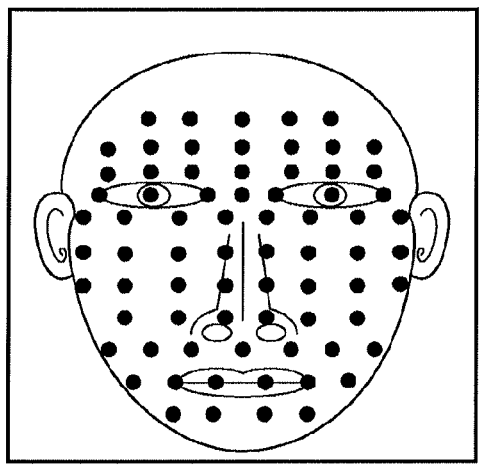
FIG. 19 is a view for explaining a conventional local region positioning method.
Figure 20:
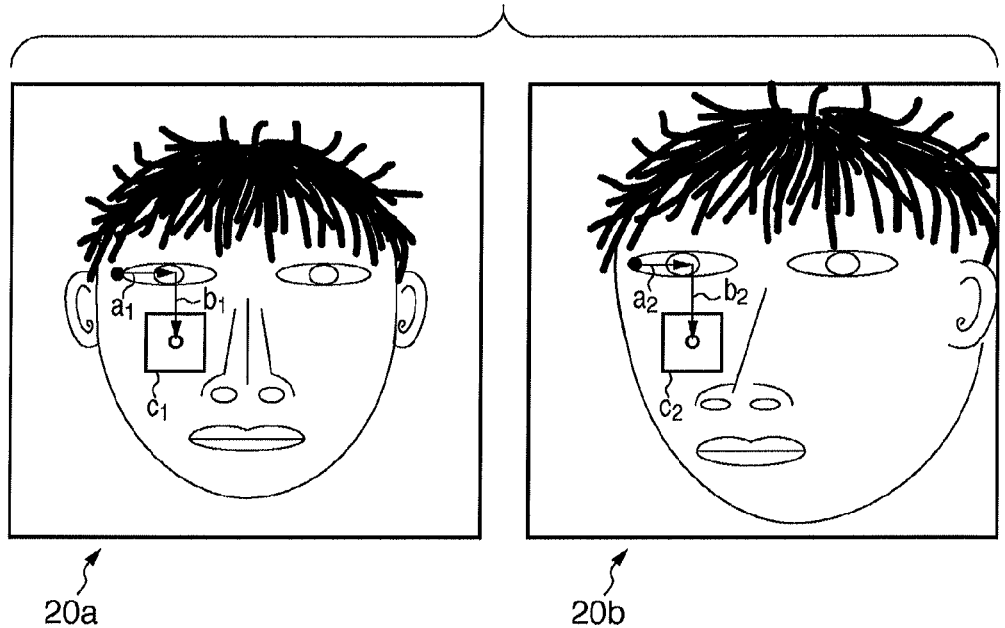
FIG. 20 is a view for explaining the conventional local region positioning method.
Figure 21:
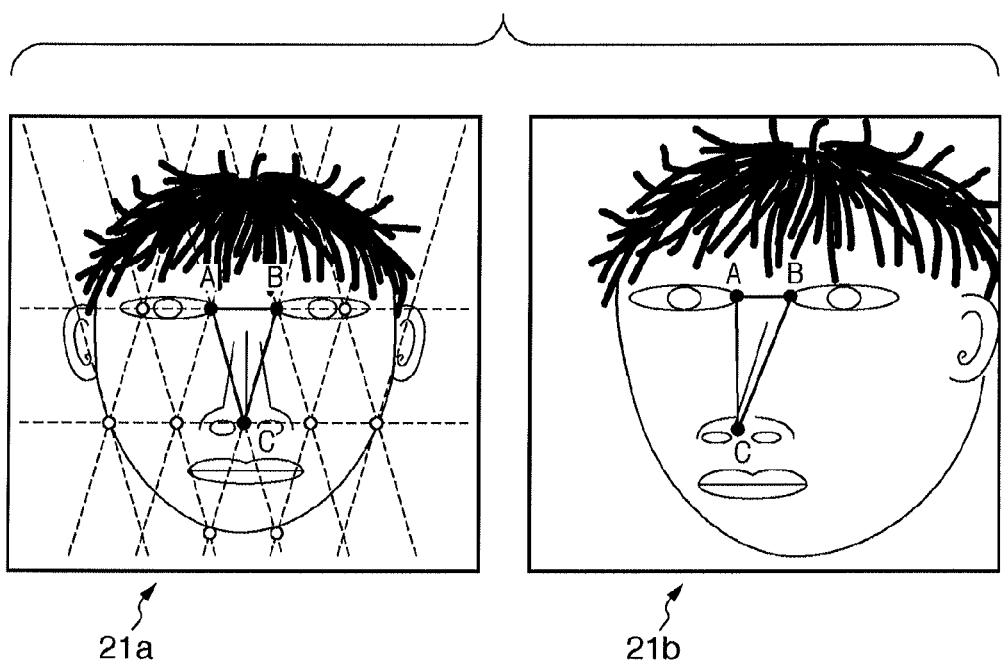
FIG. 21 is a view for explaining the conventional local region positioning method.

FIGS. 17A and 17B are flowcharts for explaining details of the local region position/size calculation (steps S208 and S308) including determination of a size of a local region to be clipped based on feature points. FIG. 18 is a view showing an example of the local feature setting table 120 in this embodiment. Referring to FIG. 18, since an initial point, moving destinations 1 and 2, and projection matrix have already been described above using FIG. 6, a description thereof will not be repeated. A clipping size and size after transformation will be described later.

A feature amount to be extracted uses a Gabor feature amount which is different for each Index in this embodiment. The Gabor feature amount is extracted by convolution calculations using Gabor jet filters shown in FIG. 6. In this embodiment, as shown in FIG. 6, Gabor jet filters of 12 different types including three different sizes and four different directions are used. Each filtering is executed after each local region is clipped and is transformed into a predetermined size. Since feature amounts used in respective local regions are different, it is normally preferable to execute processes in this order so as to attain high processing efficiency.

In FIG. 17A, the processes in steps S1701 to S1710 are the same as those in steps S1401 to S1410 in FIG. 14, and a detailed description thereof will not be repeated.

It is checked in step S1711 if the clipping size is fixed. In the local feature setting table 120 in FIG. 18, the clipping size is fixed (Fixed) in local regions with Index=3 and 5, and in such case, the process advances to step S1712. Then, a fixed value defined as a size after transformation is determined as the clipping size.

On the other hand, if the clipping size is not fixed, the process advances to step S1713, and a width calculation method defined in the field of the clipping size is checked. In the local feature setting table 120 in FIG. 18, local regions with Index=1, 2, and 4 are designated with calculation methods of calculating the clipping size.

In FIG. 18, a term "Width:" includes a definition required to calculate a clipping size in the width direction. For example, in case of Index=1, "Line( )" is designated in the term "Width:". "Line( )" indicates a method of calculating the clipping size based on a line segment length (line segment length reference), and the first two (LeftEye, RightEye) out of three parameters in the parentheses indicate feature points as references for calculations. The last numeric value (0.3) in the parentheses designates a ratio upon proportionally dividing a line segment that couples two feature points as references for calculations (size calculation ratio).

That is, in case of line segment length reference, a value obtained by calculating a line segment length from the coordinates of two feature points, and multiplying the length by a ratio is determined as a size in the width direction. In addition, a method "Width( )" of calculating a size based on a width (width reference), and a method "Height( )" of calculating a size based on a height (height reference) can be designated. In these methods, two feature points and a size calculation ratio are similarly designated.

Likewise, a "Height:" term includes a definition required to calculate a clipping size in the height direction.

If the line segment length reference is determined in step S1713, the process advances to step S1714, and the length of a line segment that couples two feature points is calculated based on the coordinates of these feature points as a reference length. Likewise, if the width reference is determined, the process advances to step S1715 to calculate a coordinate difference between two feature points in the width direction as a reference length. Also, if the height reference is determined, the process advances to step S1716 to calculate a coordinate difference between two feature points in the height direction as a reference length.

In step S1717, the reference length calculated based on one of the line segment length reference, width reference, and height reference is multiplied by a value of a size calculation ratio, as described above, thus determining the product as the clipping size in the width direction.

The clipping size in the height direction is similarly determined by the processes in steps S1718 to S1722.

In step S1723, the clipping sizes in the width and height directions, which are determined by the above processes, are output together with the final position. In this way, the local region position/size calculation is completed.

In the local region clipping (steps S209 and S309) in FIGS. 2 and 3, an image within the local region is clipped from the re-normalized face image based on the determined position and size of the local region. Unlike in the first embodiment, the local feature setting table 120 in FIG. 18 is loaded, and the size after transformation corresponding to "Index" to be currently processed is acquired. Based on the clipping size and size after transformation, independent variable scaling factors $S_x$ and $S_y$ in the vertical and horizontal directions are calculated, and an image with the size after transformation is obtained by executing size variable scaling based on an affine transformation matrix given by:

$$T = \begin{pmatrix} S_x & 0 & 0 \\ 0 & S_y & 0 \\ 0 & 0 & 1 \end{pmatrix} \quad (5)$$

Since the size after transformation is a constant value in each Index, a projection matrix is calculated in advance by learning as in the first embodiment as a transformation matrix from a predetermined dimension to that after projection.

As can be seen from the above description, according to this embodiment, by calculating the clipping size of each local region based on feature points, the local region having a more constant range on an actual face than the first embodiment can be clipped. That is, not only the position but also a relative range of the local region can be stably designated. Furthermore, according to this embodiment, since the aspect ratio of the clipping range can be adaptively changed, the degree of matching of local region ranges can be enhanced, and it is expected to further improve the discrimination performance.

[Fourth Embodiment]

In each of the above embodiments, the present invention is applied to the face recognition for mainly specifying an individual from a face image. The image processing method of the present invention is not limited to such specific application. For example, the present invention can be applied to many kinds of image processing for discriminating similar patterns such as determination of models of cars and that of species based on wing patterns of butterflies.

In each of the above embodiments, as the pattern detector, a detector based on a strong classifier prepared by cascade-connecting weak classifiers, and a pattern detector based on a neural network are used. The pattern detector may be combined with other pattern detectors.

In each of the above embodiments, an implementation example of the face recognition apparatus based on hardware, and that of the face recognition apparatus using the CPU have been exemplified. However, the image processing apparatus of the present invention does not depend on the implementation method. For example, a DSP (Digital Signal Processor) may be used in some calculations of processing, or the image processing apparatus may be applied to a distributed processing system connected via a network. For example, the present invention can be applied to a system in which an image input from a client is discriminated by a server.

Furthermore, a program for making a computer implement the image processing method according to the present invention, and a storage medium storing that program are included in the scope of the present invention.

[Other Embodiments]

Note that the present invention may be applied to either a system constituted by a plurality of devices (e.g., a host computer, interface device, reader, and printer), or an apparatus consisting of a single device (e.g., a copying machine or facsimile apparatus).

The objects of the present invention are also achieved by supplying a computer-readable storage medium, which records a program code of software that implements the functions of the aforementioned embodiments to the system or apparatus. In this case, the functions are implemented when a computer (or a CPU or MPU) of the system or apparatus reads out and executes the program code stored in the storage medium. Note that the storage medium that stores the program code constitutes the present invention in such case.

As the storage medium for supplying the program code, for example, a floppy® disk, hard disk, optical disk, magneto-optical disk, CD-ROM, CD-R, magnetic tape, nonvolatile memory card, and ROM may be used.

The present invention is not limited to the case in which the functions of the aforementioned embodiments are implemented when the computer executes the readout program code. For example, the present invention also includes a case in which an OS (operating system) or the like running on a computer may execute some or all of actual processes based on an instruction of the program code to implement the functions of the aforementioned embodiments.

Furthermore, the present invention also includes a case in which the functions of the aforementioned embodiments are implemented after the program code read out from the storage medium is written in a memory equipped on a function expansion board or unit, which is inserted in or connected to the computer. That is, the present invention includes a case in which after the program code is written in the memory, a CPU or the like equipped on the function expansion board or unit executes some or all of actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-051118 filed on Feb. 29, 2008, which is hereby incorporated by reference herein in its entirety.

What is claimed is:

1. An image processing apparatus comprising:
    a feature point extraction unit configured to extract feature points from an image to be discriminated;
    a holding unit configured to hold a table which defines information required to designate a moving destination of a feature point and a size of an image to be clipped at the moving destination for each feature point using feature points to be extracted;
    a calculation unit configured to calculate the moving destination of each of the extracted feature points and a size of an image to be clipped at the moving destination based on a definition in the table;
    a clipping unit configured to clip an image with the calculated size at the calculated moving destination as a local region; and
    a discrimination unit configured to discriminate an image similar to the image to be discriminated using a feature amount extracted from the local region.

2. The apparatus according to claim 1, wherein a moving direction required to specify the moving destination is defined in the table using feature points to be extracted.

3. The apparatus according to claim 2, wherein the moving direction is defined by one of a direction of a line segment that couples the feature points to be extracted, a direction of a horizontal component of a line segment that couples the feature points to be extracted, and a direction of a vertical component of a line segment that couples the feature points to be extracted.

4. The apparatus according to claim 2, wherein a moving distance required to specify the moving destination is defined in the table using a ratio which proportionally divides a line segment that couples the feature points to be extracted.

5. The apparatus according to claim 4, wherein said calculation unit calculates the moving distance by multiplying a length of the line segment by the ratio.

6. The apparatus according to claim 1, wherein a size of the image to be clipped at the moving destination is defined in the table as a fixed value.

7. An image processing method comprising:
    extracting feature points from an image to be discriminated;
    calculating a moving destination of each of the extracted feature points and a size of an image to be clipped at the moving destination based on a table which defines information required to designate a moving destination of a feature point and a size of an image to be clipped at the moving destination using feature points to be extracted;
    clipping an image with the calculated size at the calculated moving destination as a local region; and
    discriminating an image similar to the image to be discriminated using a feature amount extracted from the local region.

8. A non-transitory computer-readable storage medium storing a program for making a computer execute an image processing method according to claim 7.

* * * * *